(12) United States Patent  
Diachina et al.

(10) Patent No.: US 9,277,552 B2
(45) Date of Patent: Mar. 1, 2016

(54) OPTIMIZED SYSTEM ACCESS PROCEDURES

(71) Applicant: TELEFONAKTIEBOLAGET L M ERICSSON (PUBL), Stockholm (SE)

(72) Inventors: John Walter Diachina, Garner, NC (US); Daniel Widell, Vikbolandet (SE); Paul Schliwa-Bertling, Ljungsbro (SE); Nicklas Johansson, Brokind (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 210 days.

(21) Appl. No.: 13/856,211

(22) Filed: Apr. 3, 2013

(65) Prior Publication Data

US 2013/0235855 A1 Sep. 12, 2013

Related U.S. Application Data

(63) Continuation-in-part of application No. 13/613,122, filed on Sep. 13, 2012, and a continuation-in-part of application No. 13/613,107, filed on Sep. 13, 2012, now Pat. No. 8,797,991.

(60) Provisional application No. 61/620,696, filed on Apr. 5, 2012, provisional application No. 61/535,509, filed on Sep. 16, 2011.

(51) Int. Cl.
*H04W 72/04* (2009.01)
*H04W 72/14* (2009.01)
*H04W 74/08* (2009.01)

(52) U.S. Cl.
CPC .......... *H04W 72/0446* (2013.01); *H04W 72/14* (2013.01); *H04W 74/0833* (2013.01)

(58) Field of Classification Search
CPC . H04W 72/00; H04W 72/04; H04W 72/0406; H04W 72/042; H04W 72/0446; H04W 72/12; H04W 72/1205; H04W 72/1278; H04W 72/1289; H04W 72/1294; H04W 72/14; H04W 74/00; H04W 74/002; H04W 74/006
See application file for complete search history.

(56) References Cited

U.S. PATENT DOCUMENTS

| 5,926,469 A | 7/1999 | Norstedt et al. |
| 7,366,155 B1 | 4/2008 | Leppisaari et al. |

(Continued)

FOREIGN PATENT DOCUMENTS

| EP | 1 727 387 A2 | 11/2006 |
| WO | WO 0163775 A2 | 8/2001 |

(Continued)

OTHER PUBLICATIONS

3GPP: ETSI TS 145 002 v10.0.0; Mar. 2012, revision 10; 650 Route des Lucioles, Sophia Antipolis, France; Mar. 2012.

(Continued)

*Primary Examiner* — Chi H Pham
*Assistant Examiner* — Weibin Huang

(57) ABSTRACT

A base station subsystem (BSS) and a method are described herein for improving an Access Grant Channel (AGCH) capacity when a downlink Temporary Block Flow (TBF) is established for at least one mobile station and used for sending the respective downlink payload. Plus, a mobile station (MS) and a method are described herein for improving the AGCH capacity when the mobile station is sent information required for establishing a downlink TBF on which it receives its respective downlink payload.

32 Claims, 15 Drawing Sheets

(56) References Cited

U.S. PATENT DOCUMENTS

| | | |
|---|---|---|
| 7,433,460 B2 | 10/2008 | Budka |
| 2003/0050072 A1 | 3/2003 | Noerpel et al. |
| 2003/0076812 A1 | 4/2003 | Benedittis |
| 2004/0047343 A1* | 3/2004 | Muniere .......... H04W 72/0413 370/352 |
| 2006/0268774 A1 | 11/2006 | Kangas et al. |
| 2007/0161385 A1 | 7/2007 | Anderson |
| 2007/0223405 A1 | 9/2007 | Jiang et al. |
| 2007/0265012 A1* | 11/2007 | Sorbara ................ H04L 12/189 455/446 |
| 2008/0151828 A1* | 6/2008 | Bjorken .............. H04W 72/044 370/329 |
| 2009/0170498 A1 | 7/2009 | Venkatasubramanian et al. |
| 2009/0196230 A1 | 8/2009 | Kim et al. |
| 2009/0233634 A1 | 9/2009 | Aghili et al. |
| 2010/0080125 A1 | 4/2010 | Olsson et al. |
| 2011/0116368 A1 | 5/2011 | Bergstrom et al. |
| 2011/0274040 A1 | 11/2011 | Pani et al. |
| 2012/0127951 A1* | 5/2012 | Dhanda ............... H04W 74/006 370/330 |
| 2012/0250630 A1 | 10/2012 | Paiva et al. |
| 2013/0044709 A1 | 2/2013 | Adjakple et al. |
| 2013/0064176 A1 | 3/2013 | Hsu et al. |
| 2013/0294319 A1 | 11/2013 | Haapaniemi et al. |

FOREIGN PATENT DOCUMENTS

| | | |
|---|---|---|
| WO | WO 2007/091831 A2 | 8/2007 |
| WO | WO 2008/041941 A1 | 4/2008 |
| WO | WO 2009/097602 A1 | 8/2009 |
| WO | WO 2009/102252 A1 | 8/2009 |

OTHER PUBLICATIONS

Huawei, et al.: "Continued Discussion for IPA Parameters"; 3GPP TSG GERAN #51; Gothenburg, Sweden; Aug. 29, 2011.

Ericsson, et al.: "Usage of Higher MCSs on CCCH Downlink"; GP-111065; 3GPP TSG GERAN Meeting#51, Gothenburg, Sweden; Aug. 29, 2011.

Ericsson, et al.: "Improved AGCH Capacity Using Static Radio Parameters"; GP-111708; 3GPP TSG GERAN #52, Bratislava, Slovakia; Nov. 21, 2011.

Ericsson, et al.: "Calculating the Probability of Access Collision"; GP-111709; 3GPP TSG GERAN #52, Bratislava, Slovakia; Nov. 21, 2011.

3GPP: "Analysis on Traffic Characteristic of IM Service in China"; GP-111085; 3GPP TSG GERAN #51, Gothenburg, Sweden; Aug. 29, 2011.

Huawei: "Further Discussion on IPA Message"; 3GPP TSG GERAN #50; Dallas, TX USA; GP-110616; May 16, 2011.

* cited by examiner

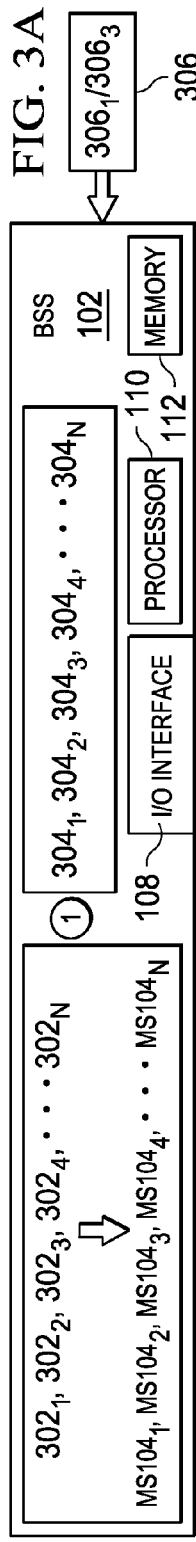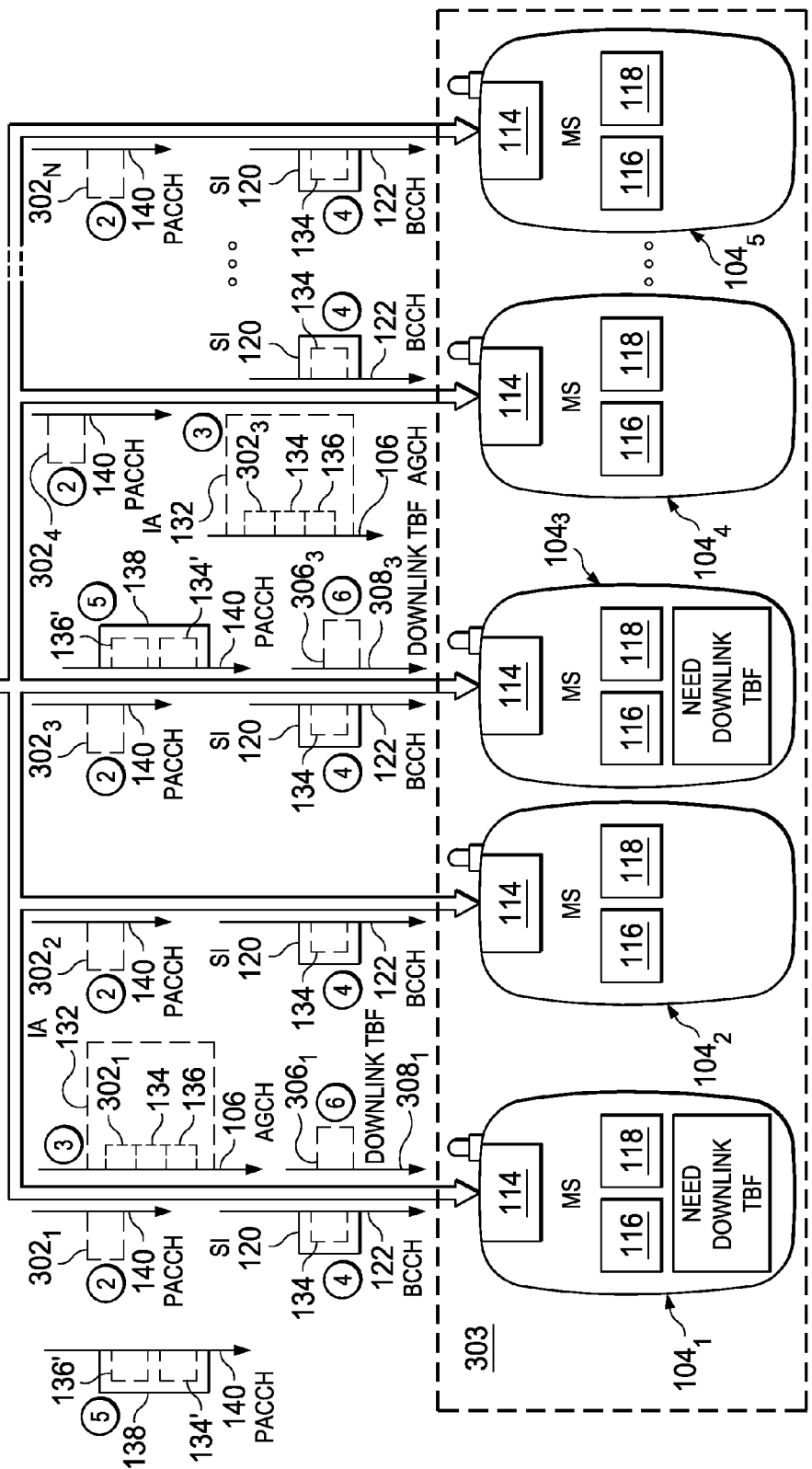

OPTIMIZED SYSTEM ACCESS PROCEDURES

CLAIM OF PRIORITY

This application claims the benefit U.S. Provisional Application Ser. No. 61/620,696 filed on Apr. 5, 2012. Moreover, this patent application is a continuation-in-part of U.S. patent application Ser. No. 13/613,122 filed Sep. 13, 2012, now pending, which claims the benefit of U.S. Provisional Application Ser. No. 61/535,509 filed on Sep. 16, 2011 and of U.S. Provisional Application Ser. No. 61/620,696 filed on Apr. 5, 2012. Furthermore, this patent application is a continuation-in-part of U.S. patent application Ser. No. 13/613,107 filed Sep. 13, 2012, now pending, which claims the benefit of U.S. Provisional Application Ser. No. 61/535,509 filed on Sep. 16, 2011 and of U.S. Provisional Application Ser. No. 61/620,696 filed on Apr. 5, 2012. The contents of these documents are hereby incorporated by reference herein.

TECHNICAL FIELD

The present invention relates to a base station subsystem (BSS) and a method for improving an Access Grant Channel (AGCH) capacity when a downlink Temporary Block Flow (TBF) is established for at least one mobile station and used for sending the respective downlink payload. Plus, the present invention relates to a mobile station (MS) and a method for improving the AGCH capacity when the mobile station is sent information required for establishing a downlink TBF on which it receives its respective downlink payload.

BACKGROUND

In the wireless telecommunications field it is anticipated that there will be an ever increasing Common Control Channel (CCCH) congestion as a result of downlink transmissions from a base station to mobile stations (e.g., smart phones). Various solutions to address the CCCH congestion problem and other problems are the subject of the present invention.

ABBREVIATIONS

The following abbreviations are herewith defined, at least some of which are referred to within the following description of the present invention.
AGCH Access Grant Channel
ARFCN Absolute Radio Frequency Channel Number
ATI Additional TBF Information
BCCH Broadcast Control Channel
BSS Base Station Subsystem
CCCH Common Control Channel
CS Circuit Switched
DRX Discontinuous Reception
EGPRS Enhanced General Packet Radio Service
EPCR Enhanced Packet Channel Request
eTFI Enhanced Temporary Flow Identity
eUSF Enhanced Uplink State Flag
FN Frame Number
IA Incoming Access
IE Information Element
LAP Low Access Priority
LLC Logical Link Control
MAC Media Access Control
M2M Machine-to-Machine
OSAP Optimized System Access Procedure
PACCH Packet Associated Control Channel
PCH Paging Channel
PDU Packet Data Unit
PFC Packet Flow Context
PRR Packet Resource Request
PUA Packet Uplink Assignment
PUAN Packet Uplink Ack/Nack
RF Radio Frequency
RLC Radio Link Control
SI System Information
TBF Temporary Block Flow
TCH Traffic Channel
TDMA Time Division Multiple Access
TLLI Temporary Logical Link Identity
TOI Temporary OSAP Identity
TSC Training Sequence Code

SUMMARY

A base station subsystem (BSS), a mobile terminal (MS) and methods that address the aforementioned CCCH congestion problem by improving the capacity on an AGCH are described in the independent claims of the present application. Advantageous embodiments of the BSS, the MS and methods have been described in the dependent claims of the present application.

In one aspect, the present invention provides a BSS configured to interact with a plurality of MSs and perform a procedure (e.g., the optimized system access procedure) to improve an AGCH capacity. The BSS comprises a processor and a memory that stores processor-executable instructions where the processor interfaces with the memory and executes the processor-executable instructions to enable an assign operation, a first send operation, and a second send operation. The assign operation includes assigning a plurality of alternative identities to the plurality of mobile stations, wherein one of the alternative identities is assigned to one of the mobile stations, wherein each alternative identity is assigned on a per cell basis and is unique within a cell, wherein for each alternative identity there is started a corresponding ready timer where each alternative identity remains valid while the corresponding ready timer is running. The first send operation includes sending each one of the alternative identities to corresponding each one of the mobile stations. After the assign operation and the first send operation and when at least one of the plurality of mobile stations for which downlink TBF establishment is needed is in an idle mode and the corresponding at least one ready timer is still running, the second send operation is performed which comprises sending an immediate assignment message on the AGCH to the at least one of the plurality of mobile stations. The immediate assignment message comprises (1) the at least one alternative identity for the at least one of the plurality of mobile stations, and (2) at least a portion of dynamic radio parameters which are to be used by the at least one of the plurality of mobile stations when establishing their respective to downlink TBF. The BSS needs to establish a downlink TBF for each of the at least one of the mobile stations whenever it needs to send them their respective downlink payload. The present invention is an advantage over the prior art because the new BSS can assign a downlink TBF to the MS while the MS is in idle mode (without first having to perform a paging procedure for identifying the MS location on a cell specific basis), wherein the downlink TBF assignment procedure includes sending one immediate assignment message in the second send operation that can address a multiplicity of MSs which significantly exceeds the multiplicity of MSs that can be addressed by using the legacy immediate assignment message.

In another aspect, the present invention provides a method implemented by a BSS, which interacts with a plurality of MSs, for performing a procedure (e.g., the optimized system access procedure) to improve an AGCH capacity. The method comprises an assigning step, a first sending step, and a second sending step. The assigning step includes assigning a plurality of alternative identities to the plurality of mobile stations, wherein one of the alternative identities is assigned to one of the mobile stations, wherein each alternative identity is assigned on a per cell basis and is unique within a cell, and wherein for each alternative identity there is started a corresponding ready timer where each alternative identity remains valid while the corresponding ready timer is running. The first sending step includes sending each one of the alternative identities to corresponding each one of the mobile stations. After the assigning step, the first sending step and when at least one of the plurality of mobile stations for which downlink TBF establishment is needed is in an idle mode and the corresponding at least one ready timer is still running, the second sending step is performed which comprises sending an immediate assignment message on the AGCH to the at least one of the plurality of mobile stations. The immediate assignment message comprises (1) the at least one alternative identity for the at least one of the plurality of mobile stations, and (2) at least a portion of dynamic radio parameters which are to be used by the at least one of the plurality of mobile stations when establishing their respective downlink TBF. The BSS needs to establish a downlink TBF for each of the at least one of the mobile stations whenever it needs to send them their respective downlink payload. The present invention is an advantage over the prior art because the new BSS can to assign a downlink TBF to the MS while the MS is in idle mode (without first having to perform a paging procedure for identifying the MS location on a cell specific basis), wherein the downlink TBF assignment procedure includes sending one immediate assignment message in the second send operation that can address a multiplicity of MSs which significantly exceeds the multiplicity of MSs that can be addressed by using the legacy immediate assignment message.

In another aspect, the present invention provides a MS configured to interact with a BSS and to improve an AGCH capacity. The MS comprising a processor and a memory that stores processor-executable instructions where the processor interfaces with the memory and executes the processor-executable instructions to enable a first receiving operation, and a second receiving operation. The first receiving operation includes receiving an alternative identity on PACCH signaling from the BSS. The second receiving operation is performed while the MS is in idle mode and includes receiving an immediate assignment message on the AGCH sent from the BSS when a downlink TBF needs to be established. The immediate assignment message comprises (1) the alternative identity, and (2) at least a portion of dynamic radio parameters which are to be used when establishing the downlink TBF. The present invention is an advantage over the prior art because the MS, by performing the first and second receiving operations, may experience less delay in downlink TBF establishment and therefore less delay in reception of downlink payload that becomes available in the BSS. This is made possible in part because the BSS can address the immediate assignment message to a multiplicity of MSs that significantly exceeds the multiplicity of MSs which can be addressed by using the legacy immediate assignment message.

In another aspect, the present invention provides a method implemented by a MS which interacts with a BSS for improving an AGCH capacity. The method comprises a first receiving step, and a second receiving step. The first receiving step includes receiving an alternative identity on PACCH signaling from the BSS. The second receiving step is performed while the MS is in idle mode and includes receiving an immediate assignment message on the AGCH sent from the BSS when a downlink TBF needs to be established. The immediate assignment message comprises (1) the alternative identity, and (2) at least a portion of dynamic radio parameters which are to be used when establishing the downlink TBF. The present invention is an advantage over the prior art because the MS, by performing the first and second receiving steps, may experience less delay in downlink TBF establishment and therefore less delay in reception of downlink payload that becomes available in the BSS. This is made possible in part because the BSS can address the immediate assignment message to a multiplicity of MSs that significantly exceeds the multiplicity of MSs which can be addressed by using the legacy immediate assignment message.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 3A-3C are several diagrams uses to help explain the wireless signaling that occurs between the BSS and multiple MSs to improve the capacity of the AGCH in accordance with a third embodiment of the present invention;

DETAILED DESCRIPTION

Figure 1A:
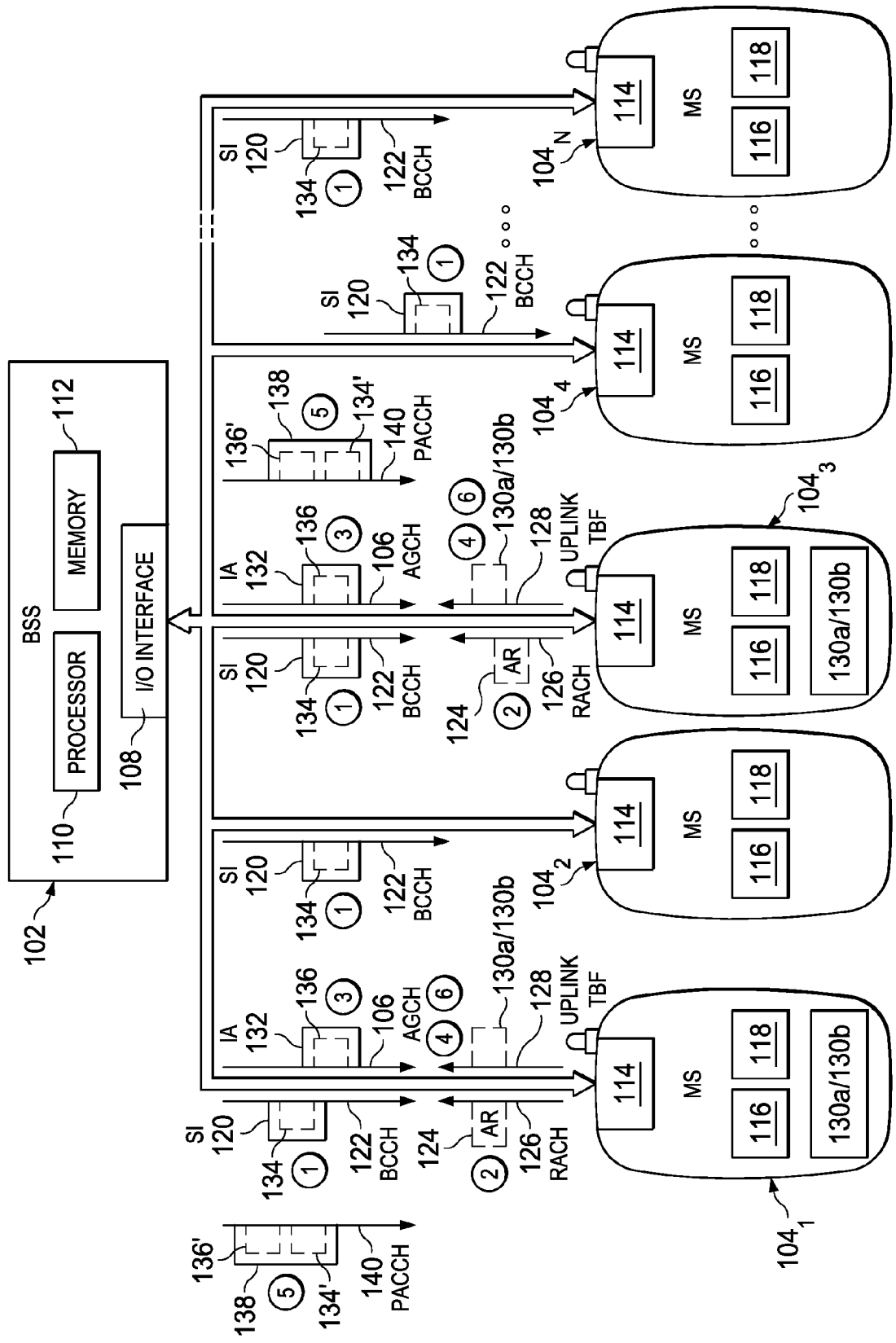
FIGS. 1A-1E are several diagrams uses to help explain the wireless signaling that occurs between the BSS and multiple MSs to improve the capacity of the AGCH in accordance with a first embodiment of the present invention.

Referring to FIG. 1A, there is a diagram illustrating the basic wireless signaling that occurs between a BSS 102 and multiple MSs $104_1$, $104_2$, $104_3$, $104_4$ ... $104_n$ to improve the capacity of the AGCH 106 in accordance with a first embodiment of the present invention. As shown, the BSS 102 broadcasts a new SI 120 on the BCCH 122 to the MSs $104_1$, $104_2$, $104_3$, $104_4$ ... $104_n$ (step 1). The new SI 120 includes a predetermined set of packet radio resources 134 (i.e., static radio parameters 134) which are to be used by the MSs $104_1$, $104_2$, $104_3$, $104_4$ ... $104_n$ whenever any one of the MSs $104_1$, $104_2$, $104_3$, $104_4$ ... $104_n$ establishes the uplink TBF 128 that is triggered by the SDT 130a or the IMT 130b (note: the new SI 120 indicates that the BSS 120 is configured to perform an optimized system access procedure to improve the AGCH capacity). The BSS 102 receives one or more access requests 124 on the RACH 126 from one or more MSs $104_1$ and $104_3$ (for example) which now want to transmit the SDT 130a or the IMT 130b and are requesting to establish the uplink TBF 128 (step 2) (note: the MS would send the access request 124 only if the BSS 102 is configured to perform the optimized system access procedure to improve the AGCH capacity). In response to receiving the access requests 124, the BSS 102 sends the immediate assignment message 132 on the AGCH 106 to the requesting MSs $104_1$ and $104_3$ (step 3). The immediate assignment message 132 includes at least a portion of the dynamic radio parameters 136 which are to be used along with the previously sent static radio parameters 134 by the requesting MSs $104_1$ and $104_3$ to establish the corresponding uplink TBFs 128 and transmit the corresponding SDT 130a or IMT 130b (step 4). If only one MS $104_1$ (for example) sends an access request 124 to the BSS 102 during an allowed access time interval, then the BSS 102 could choose to send a legacy immediate assignment message which includes the complete set of dynamic radio parameters 136 to the individual MS $104_1$ so it can establish the uplink TBF 128 and transmit the SDT 130a or IMT 130b. Or, the BSS 102 could send the immediate assignment message 132 to the individual MS $104_1$ so it can establish the uplink TBF 128 and transmit the SDT 130a or IMT 130b.

If desired, the BSS 102 does not need to include all of the dynamic radio parameters in the immediate assignment message 132 which are needed by the MSs $104_1$ and $104_3$ to establish the uplink TBFs 128. In this case, the BSS 102 would send a remaining portion of the dynamic radio parameters 136' in a message 138 on a PACCH 140 to the requesting MSs $104_1$ and $104_3$ which were addressed by the immediate assignment message 132 (step 5). Furthermore, the BSS 102 could send additional static radio parameters 134' in the message 138 (or some other PACCH message if the remaining dynamic radio parameters 136' are not sent) on the PACCH 140 to the requesting MSs $104_1$ and $104_3$ addressed by the immediate assignment message 132 (step 5). Then, the requesting MSs $104_1$ and $104_3$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the corresponding uplink TBFs 128 to transmit the corresponding SDT 130a or IMT 130b (step 6). In any case, this process is a marked improvement over the prior art since the traditional BSS was configured to send an immediate assignment message (which included the needed static and dynamic radio parameters) to only one MS at a time rather than being configured as in the present invention to send an immediate assignment message 132 to multiple MSs $104_1$ and $104_3$ (for example) at the same time which improves the capacity of the AGCH 106. A more detailed discussion is provided next about the various features and advantages of the first embodiment of the present invention.

The aforementioned basic concept of the first embodiment considered here is that of allowing for a network to identify a pre-determined set of packet radio resources 134 (i.e. default radio resources 134, static radio parameters 134) that are to be used whenever a to MS access request 124 is triggered by a SDT 130a or an IMT 130b. These default radio resources 134 are identified by including them as a new SI 120 which can indicate a set of one or more static radio parameters 134 that the network would commonly assign when using a legacy packet access procedure to assign radio resources appropriate for the MS's SDT or IMT transmissions. This new SI 120 has the static radio parameters 134 where each set of static radio parameters 134 includes a corresponding Radio Assignment Identity (RAID) value (referenced by the enhanced immediate assignment message 132 on the AGCH 106) along with associated parameter values for the following Information Elements (IEs) (which can currently be included within a legacy immediate assignment message):

Page Mode
Packet Channel Description
Mobile Allocation
Starting Time
IA Rest Octets A network supporting the transmission of static radio parameters 134 as part of SI 120 should therefore include at least one complete set of these parameters. The MS $104_1$, $104_2$, $104_3$, $104_4$ ... $104_n$ that receives these static radio parameters 134 via SI 120 will not need to be sent this same information on the AGCH 106 when attempting a system access for an SDT or IMT transmission. As such, this packet radio resource pre-allocation procedure effectively frees up AGCH capacity by modifying the immediate assignment message 132 to only include the dynamic radio parameters 136 (e.g. timing advance and TFI) (not the static radio parameters 134) needed by the requesting MS $104_1$ and $104_3$ when establishing an uplink TBF 128. The modified immediate assignment message 132 (e.g., enhanced immediate assignment (EIA) message 132) allows for a greater number of MSs $104_1$, $104_2$, $104_3$, $104_4$ ... $104_n$ to be addressed by any given instance of an EIA message 132 when compared to a legacy immediate assignment message which can only address a single MS.

The inclusion of static radio parameters 134 within SI 120 (e.g. using SI21) indicates the BSS 102 supports reception of a new RACH burst that includes a new training sequence (TS) that the MS $104_1$ (for example) would send in the access request 124 to indicate that the SDT 130a or the IMT 130 has triggered the access attempt. The access request 124 will be 11 bits long as per the legacy EGPRS Packet Channel Request message but will use different code points and as such is referred to herein as an Enhanced Packet Channel request message 124 which can (for example) be coded as shown in TABLE 1:

TABLE 1

Enhanced Packet Channel Request Message 124's content

```
< Enhanced Packet channel request message content > ::=
    < MO SDT - One Phase Access Request :        000    < RandomBits : bit (8) > >
    | < MO IMT - One Phase Access Request :      001    < RandomBits : bit (8) > >
    | < Paging Response - One Phase Access Request :  010    < RandomBits : bit (8) > >;
```

The exemplary Enhanced Packet Channel request message 124 shown in TABLE 1 allows for five additional code points to be defined for any additional services for which a high volume of corresponding access attempts are anticipated and therefore can be better supported using the Enhanced Packet Channel request 124—Enhanced Immediate assignment message 132 signaling exchange described herein (i.e. new code points can be defined to support services other than SDT 130a and IMT 130b). In addition, this signaling scheme is not limited to being used within the context of one phase access attempts but can also be used for two access attempts. The reason that the one phase access case is indicated in TABLE 1 is that it allows for the minimum amount of control plane signaling to be used in support of SDT 130a and IMT 130b transmissions.

The MS $104_1$, $104_2$, $104_3$, $104_4$ ... $104_n$ (which is not a legacy MS) that supports the transmission of the enhanced packet channel request message 124 must of course be able to read the static radio parameters 134 sent as part of SI 120 before making such an access request 124. The rate at which the MS $104_1$, $104_2$, $104_3$, $104_4$ ... $104_n$ is expected to refresh (i.e. re-read) the static radio parameters 134 information is nominally once every 30 seconds (i.e. as per the legacy periodicity for re-reading legacy SI). Note: The Page Mode information (proposed for inclusion in the static radio parameters 134) is not expected to change often and so allowing for a nominal 30 second refresh rate for the static radio parameters 134 (and therefore the Page Mode) is considered to be acceptable.

It should be noted that the static radio parameters 134 information includes the IA Rest Octets which, as currently defined, includes USF, TFI and Request Reference information which is dynamic by its very nature. As such, either a new IA Rest Octets that excludes all dynamic information can be defined or the legacy IA Rest Octets can still be used where it is understood that the MS $104_1$, $104_2$, $104_3$, $104_4$ ... $104_n$ will simply ignore all dynamic information regardless of what it is set to.

The BSS 102's reception of an enhanced packet channel request message 124 on the RACH 126 indicates that the corresponding MS $104_1$ (for example) supports the reception of the enhanced immediate assignment message 132 on the AGCH 106. The BSS 102 can therefore respond to the access request 124 by sending the enhanced immediate assignment message 132 that includes one instance of the following dynamic radio parameters 136 for each MS $104_1$ and $104_3$ (for example) addressed by this message:

RAID corresponding to the applicable set of static radio parameters 134 (2 bits—allows for up to 4 sets of static radio parameters 134 to be included in the SI 120)
Echoed enhanced packet channel request code point (11 bits)—see Note 1
Assigned eTFI (8 bits)—See Note 2 and 3
Assigned eUSF (8 bits)—See Note 2 and 3
Timing Advance (8 bits)—See Note 4
FN Information (16 bits)—See Note 5

Note 1: This information overrides the 11 bit access request code point value if provided when the IA Rest Octets IE is sent as part of the static radio parameters 134.

Note 2: This assumes the set of static radio parameters 134 indicated by RAID is only used for the MSs $104_1$, $104_2$, $104_3$, $104_4$ ... $104_n$ that support RLC/MAC enhancements (i.e. having an RLC/MAC protocol that supports 8 bit TFI and USF values means backward compatibility will not be supported on these packet radio resources).

Note 3: It may be acceptable to leave eUSF information out of the enhanced immediate assignment message 132 if the BSS 102, after sending the MS $104_1$ (for example) the enhanced immediate assignment message 132, waits for it to move to the assigned packet radio resource and then sends it a new PACCH message 138 containing the eUSF information 136'. In other words, if eUSF information 136 is missing from the enhanced immediate assignment message 132 then the MS $104_1$ (for example) will wait to receive the eUSF information 136' in a new RLC/MAC control message 138 sent on the PACCH 140 before it can make any uplink transmissions on the allocated packet radio resource. Similarly, the enhanced immediate assignment message 132 can include a legacy TFI value (5 bits) instead of an eTFI value (8 bits) in which case the MS $104_1$ (for example) will use the legacy TFI value until it receives an eTFI assignment 136' in the new RLC/MAC control message 138 sent on the PACCH 140. Whenever PACCH signaling is used to supplement the dynamic radio parameters 136 sent with the enhanced immediate assignment message 132 then the MS $104_1$ (for example) must receive this RLC/MAC control message 138 before it can proceed to complete contention resolution as per the legacy one phase (or two phase) access procedure.

Note 4: It may be acceptable to leave Timing Advance information 136 out of the enhanced immediate assignment message 132 if the BSS 102, after sending the MS $104_1$ (for example) the enhanced immediate assignment message 132, waits for it to move to the assigned packet radio resource and then sends it a RLC/MAC control message 138 on the PACCH 140 containing the Timing Advance information 136'. In other words, if Timing Advance information is missing from the enhanced immediate assignment message 132, then the MS $104_1$ (for example) will wait to receive this information on the PACCH 140 before it can make any uplink transmissions on the allocated packet radio resource.

Figure 1B:
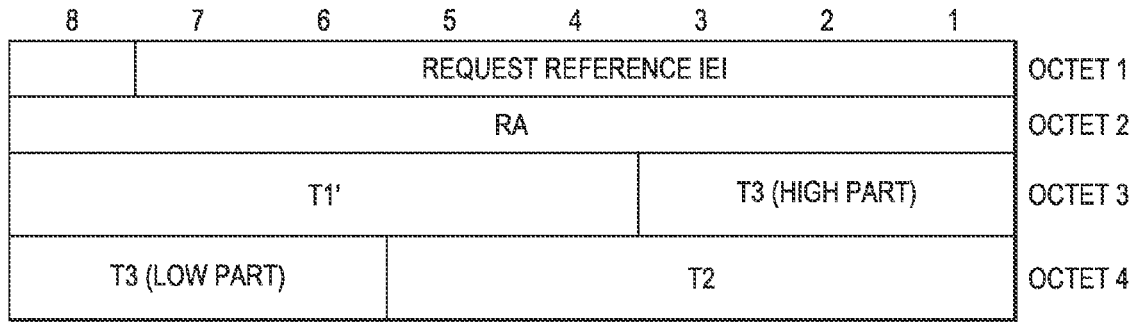

Note 5: With an 8 bit "RandomBits" field included in the enhanced packet channel request message 124 (see TABLE 1) the need for the enhanced immediate assignment message 132 to include any FN related info may be eliminated (i.e. for the case of access collision between two or more MSs $104_1$, $104_2$, $104_3$, $104_4$ ... $104_n$ all possible ambiguity will of course be cleaned up when contention resolution is completed but having an 8 bit "RandomBits" field can be viewed as being sufficient to ensure an acceptably low probability of having multiple MSs $104_1$, $104_2$, $104_3$, $104_4$ ... $104_n$ still in contention after the enhanced packet channel request message 124 (RACH 126)—enhanced immediate assignment message 132 (AGCH 106) exchange. Alternatively, some portion of the FN (frame number) can be carried within the legacy Request Reference IE and could be included such as T1' (see FIG. 1B). The purpose of the legacy Request Reference information element is to provide the random access information used in the access request message 124 sent on the RACH 126 and the frame number (FN) modulo 42432 in which the access request 124 was received. In this case, the legacy Request Reference information element shown in FIG. 1B would be coded as follows.

Figure 1C:
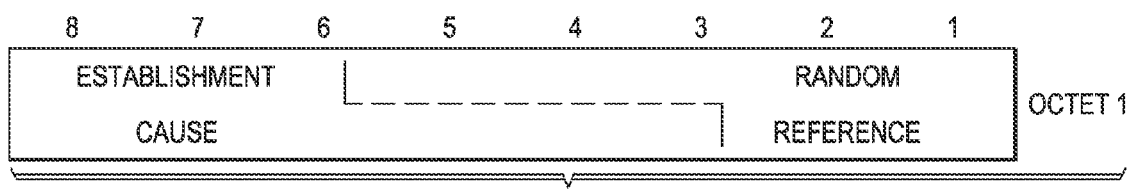

RA, Random Access Information (octet 2). This is an unformatted 8 bit field. Typically the contents of this field are coded the same as the CHANNEL REQUEST message shown in FIG. 1C T1' (octet 2). The T1' field is coded as the binary representation of (FN div 1326) mod 32.

T3 (octet 3 and 4). The T3 field is coded as the binary representation of FN mod 51. Bit 3 of octet 2 is the most significant bit and bit 6 of octet 3 is the least significant bit.

T2 (octet 4). The T2 field is coded as the binary representation of FN mod 26.

NOTE: The frame number, FN modulo 42432 can be calculated as 51×((T3−T2) mod 26)+T3+51×26×T1'

It should be noted that the Extended RA (5 bit field) can be included within the IA Rest Octets IE of the legacy Immediate Assignment (IA) message and has a content consisting of the 5 least significant bits of the EGPRS PACKET CHANNEL REQUEST message defined in 3GPP TS 44.060 (the contents of which are incorporated herein by reference). It is included for the case of an 11-bit access request message 124 since the RA field of the Request Reference IE (also included within the legacy IA message) in FIG. 1B only provides 8 bits of information and as such the full 11-bit access request message can only be echoed to a MS $104_1$ (for example) using supplementary information provided by the Extended RA IE.

The dynamic radio parameters 136 described above could be carried within the EIA Rest Octets IE of the enhanced immediate assignment message 132 as shown below in TABLE 2:

TABLE 2

Enhanced Immediate Assignment message 132

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | Immediate Assignment Message Type | Message Type 10.4 | M | V | 1 |
| | EIA Rest Octets | EIA Rest Octets 10.5.2.xx | M | V | 20 |

The sum of the length of the EIA Rest Octets IE and the L2 Pseudo Length IE equals 22 (see TABLE 2). The L2 pseudo length is the sum of lengths of all information elements present in the EIA message 132 except the EIA Rest Octets and L2 Pseudo Length information elements (i.e. 2 octets). This leaves 20 octets of space for the EIA Rest Octets which can be used to provide dynamic radio parameters 136 for a variable number of MSs $104_1$, $104_2$, $104_3$, $104_4$ ... $104_n$ as follows:

EIA Capacity Gain Case 1:
In this case all of the dynamic radio parameters 136 described above are included for each MS $104_1$, $104_2$, $104_3$, $104_4$ ... $104_n$ addressed by the EIA Rest Octets IE. This translates into 6 octets+5 bits per addressed MS $104_1$, $104_2$, $104_3$, $104_4$ ... $104_n$ which therefore allows for 3 distinct MSs to be addressed by each instance of the enhanced immediate assignment message 132 which results in a three-fold increase in the capacity of the AGCH 106 when compared to using the legacy immediate assignment message (which provides radio resources for one MS).

EIA Capacity Gain Case 2:
In this case only a subset of the dynamic radio parameters 136 described above are included for each MS $104_1$, $104_2$, $104_3$, $104_4$ ... $104_n$ addressed by the EIA Rest Octets IE as follows:
RAID corresponding to the applicable set of SDT Radio Parameters 134 (2 bits)
Echoed enhanced packet channel request code point (11 bits)
Assigned eTFI (8 bits)

This translates into 2 octets+5 bits per addressed MS $104_1$, $104_2$, $104_3$, $104_4$ ... $104_n$ which allows for six distinct MSs to be addressed by each instance of the enhanced immediate assignment message 132 which results in a six-fold increase in the capacity of the AGCH 106 when compared to using the legacy immediate assignment message (which provides radio resources for one MS).

EIA Capacity Gain Case 3:
In this case only a subset of the dynamic radio parameters 136 described above are included for each MS $104_1$, $104_2$, $104_3$, $104_4$ ... $104_n$ addressed by the EIA Rest Octets IE as follows:
RAID corresponding to the applicable set of SDT Radio Parameters 134 (2 bits)
Echoed enhanced packet channel request code point (11 bits)
Assigned Legacy TFI (5 bits)

This translates into 2 octets+2 bits per addressed MS $104_1$, $104_2$, $104_3$, $104_4$ ... $104_n$ which allows for eight distinct MSs to be addressed by each instance of the enhanced immediate assignment message 132 which results in an eight-fold increase in the capacity of the AGCH 106 when compared to using the legacy immediate assignment message (which provides radio resources for one MS).

EIA Capacity Gain Case 4:
In this case only a subset of the dynamic radio parameters 136 described above are included for each MS $104_1$, $104_2$, $104_3$, $104_4$ ... $104_n$ addressed by the EIA Rest Octets IE as follows:
RAID corresponding to the applicable set of SDT Radio Parameters 134 (2 bits)
Echoed enhanced packet channel request code point (11 bits)
A single instance of an eTFI (8 bits) is also included in the enhanced immediate assignment message 132 which the first addressed MS will consider as its assigned eTFI value. The $2^{nd}$ addressed MS will consider eTFI+1 as its assigned eTFI value and the $3^{rd}$ addressed MS will consider eTFI+2 as its assigned eTFI etc. . . .

This translates into 1 octet+5 bits per addressed MS+one instance of the 8 bit eTFI value which allows for 11 distinct MSs to be addressed by each instance of the enhanced immediate assignment message 132 which results in an eleven-fold increase in the capacity of the AGCH 106 when compared to using the legacy immediate assignment message (which provides radio resources for one MS).

It should be noted that following contention resolution the BSS 102 can choose to use PACCH signaling 138 to send a MS $104_1$, $104_2$, $104_3$, $104_4$ ... $104_n$ one or more additional sets of static radio parameters 134'. The BSS 102 can then refer to these static radio parameters 134' using RAID in subsequent enhanced immediate assignment messages it sends to that MS $104_1$, $104_2$, $104_3$, $104_4$ ... $104_n$. This therefore allows the BSS 102 to maintain MS specific static radio parameters 134' which may be of interest for certain classes of MSs (e.g. for stationary MSs) which may allow for minimizing the amount of SI 120 bandwidth used to convey static radio parameters 134. For example, only a single set of static radio parameters 134 may need to be included as part of SI 120 if the PACCH 140 is used to supplement this information as needed for specific subsets of MS $104_1$, $104_2$, $104_3$, $104_4$ ... $104_n$.

Figure 1D:
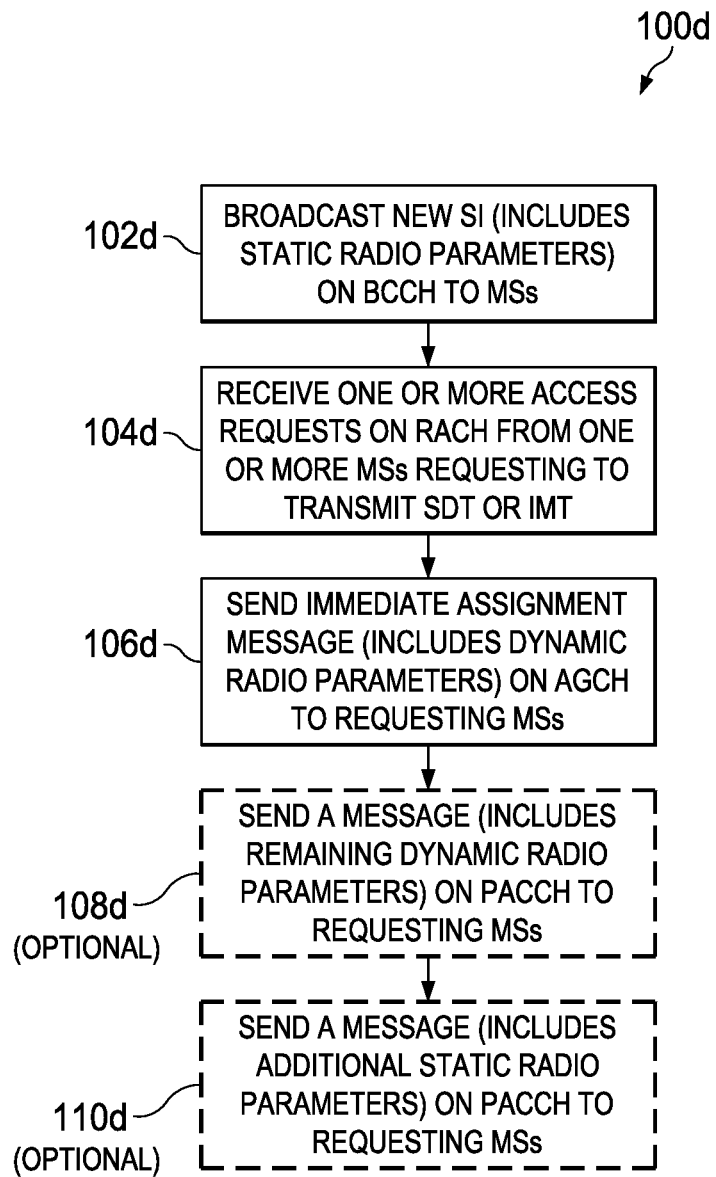

Referring to FIG. 1D, there is a flowchart of an exemplary method 100d implemented by the BSS 102 which is configured to interact with multiple MSs $104_1$, $104_2$, $104_3$, $104_4$ ... $104_n$ and perform a procedure to improve the capacity of the AGCH 106 in accordance with the first embodiment of the present invention. The BSS 102 includes the processor 110 and the memory 112 that stores processor-executable instructions where the processor 110 interfaces with the memory 112 and executes the processor-executable instructions to perform method 100d's steps as discussed next. At step 102d, the BSS 102 broadcasts the new SI 120 on the BCCH 122 to the MSs $104_1, 104_2, 104_3, 104_4 \ldots 104_n$. The new SI 120 includes a predetermined set of packet radio resources 134 (i.e., static radio parameters 134) which are to be used by the MSs $104_1, 104_2, 104_3, 104_4 \ldots 104_n$ whenever any one of the MSs $104_1, 104_2, 104_3, 104_4 \ldots 104_n$ establishes the uplink TBF 128 that is triggered by the SDT 130a or the IMT 130b. At step 104d, the BSS 102 receives one or more access requests 124 (within an allowed (i.e. restricted) access time interval) on the RACH 126 from one or more MSs $104_1$ and $104_3$ (for example) which now want to transmit the SDT 130a or the IMT 130b and are requesting to establish the uplink TBF 128. In response to receiving the access requests 124, the BSS 102 at step 206d sends the immediate assignment message 132 on the AGCH 106 for the requesting MSs $104_1$ and $104_3$. The immediate assignment message 132 includes at least a portion of the dynamic radio parameters 136 which are to be used along with the static radio parameters 134 by the requesting MSs $104_1$ and $104_3$ (for example) when establishing the corresponding uplink TBFs 128 to transmit the corresponding SDT 130a or IMT 130b. In the event, the BSS 102 does not include all of the dynamic radio parameters in the immediate assignment message 132 sent during step 106d which are needed by the requesting MSs $104_1$ and $104_3$ to establish the uplink TBFs 128, then the BSS 102 at step 108d could send a remaining portion of the dynamic radio parameters 136' in a message 138 on a PACCH 140 to the requesting MSs $104_1$ and $104_3$. If desired, the BSS 102 at step 110d could send additional static radio parameters 134' in the message 138 (or some other message if the remaining dynamic radio parameters 136' are not sent) on the PACCH 140 to the MSs $104_1$ and $104_3$. Then, the MSs $104_1$ and $104_3$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the corresponding uplink TBFs 128 to transmit the corresponding SDT 130a or IMT 130b.

Figure 1E:
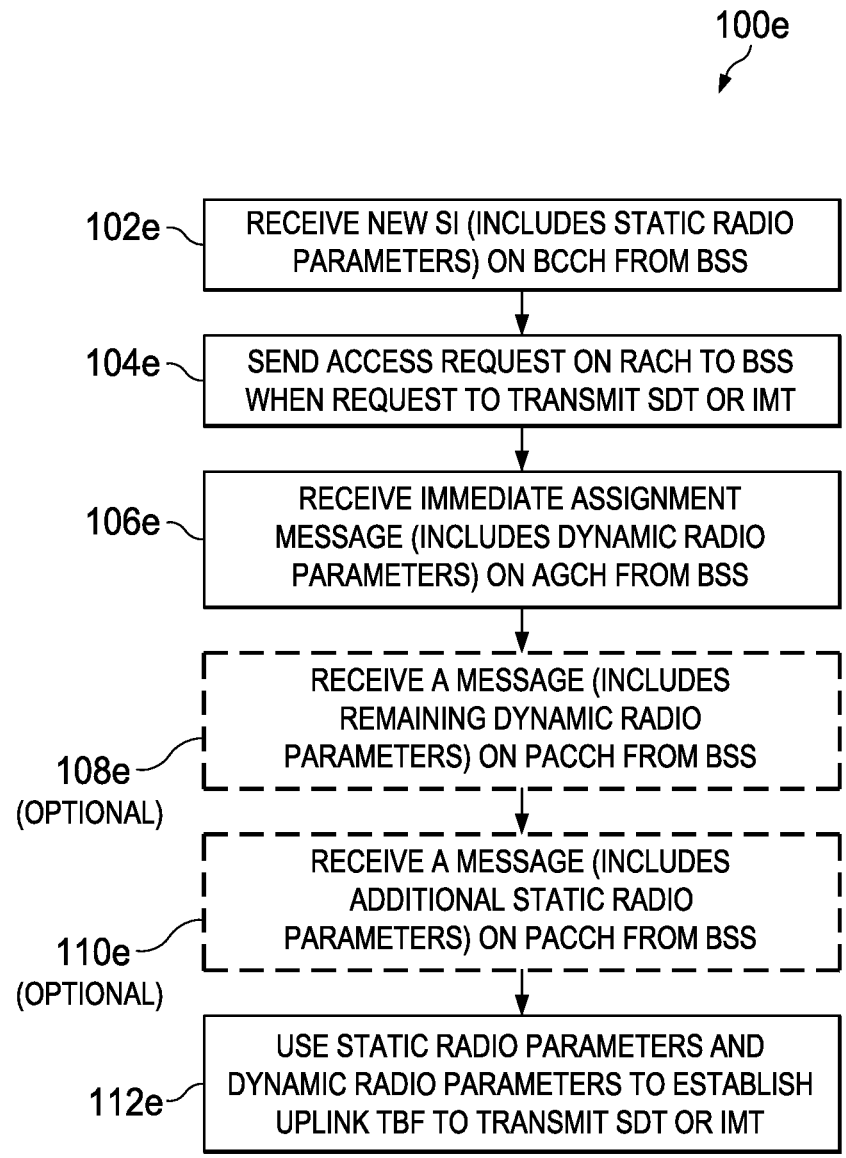

Referring to FIG. 1E, there is a flowchart of an exemplary method 100e implemented by MS $104_1$ (for example) which is configured to interact with the BSS 102 and to improve the capacity of the AGCH 106 in accordance with the first embodiment of the present invention. The MS $104_1$ includes the processor 116 and the memory 118 that stores processor-executable instructions where the processor 116 interfaces with the memory 118 and executes the processor-executable instructions to perform method 100e's steps as discussed next. At step 102e, the MS $104_1$ receives the new SI 120 on the BCCH 122 from the BSS 102. The new SI 120 includes a predetermined set of packet radio resources 134 (i.e., static radio parameters 134) which are to be used by the MS $104_1$ when establishing the uplink TBF 128 that is triggered by the SDT 130a or the IMT 130b. At step 104e, the MS $104_1$ sends the access request 124 on the RACH 126 when requesting to establish the uplink TBF 128 that is triggered by the SDT 130a or the IMT 130b. At step 106e, the MS $104_1$ receives the immediate assignment message 132 on the AGCH 106 from the BSS 102. The immediate assignment message 132 includes at least a portion of the dynamic radio parameters 136 which are to be used along with the static radio parameters 134 by the MS $104_1$ when establishing the corresponding uplink TBFs 128 to transmit the corresponding SDT 130a or IMT 130b. In the event, the BSS 102 does not include all of the dynamic radio parameters in the immediate assignment message 132 which are needed by the MS $104_1$ to establish the uplink TBFs 128, then the MS $104_1$ at step 108e would receive a remaining portion of the dynamic radio parameters 136' in a message 138 on a PACCH 140 from the BSS 102. Furthermore, the MS $104_1$ at step 110e could receive additional static radio parameters 134' in the message 138 (or some other message if the remaining dynamic radio parameters 136' are not sent) on the PACCH 140 from the BSS 102. At step 112e, the MS $104_1$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the uplink TBF 128 to transmit the SDT 130a or IMT 130b.

Figure 2A:
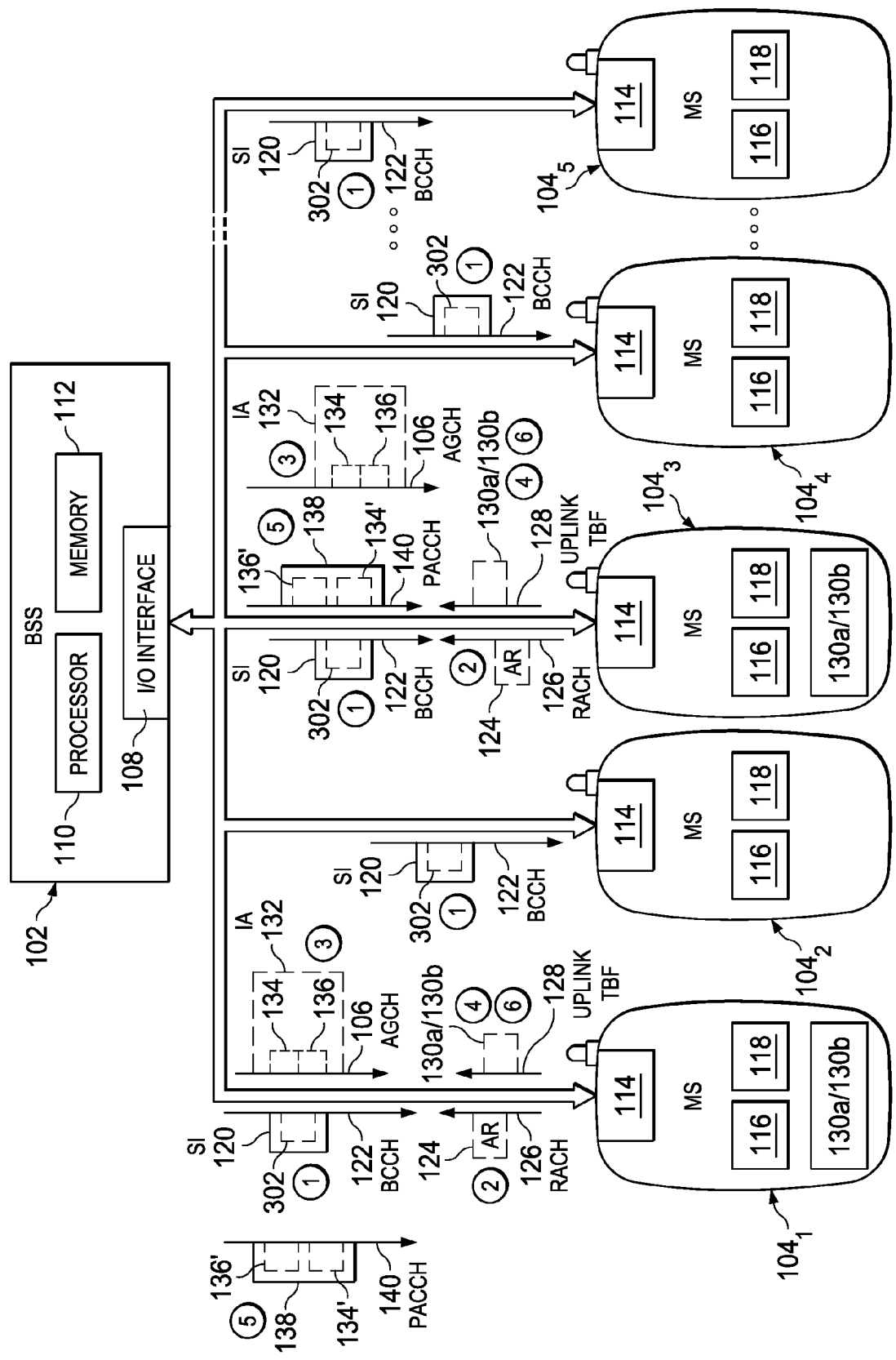
FIGS. 2A-2C are several diagrams uses to help explain the wireless signaling that occurs between the BSS and multiple MSs to improve the capacity of the AGCH in accordance with a second embodiment of the present invention.

Referring to FIG. 2A, there is a diagram illustrating the basic wireless signaling that occurs between the BSS 102 and the MSs $104_1, 104_2, 104_3, 104_4 \ldots 104_n$ (multiple MSs 104 shown) to improve the capacity of the AGCH 106 in accordance with the second embodiment of the present invention. As shown, the BSS 102 broadcasts a new SI 120 on the BCCH 122 to the MSs $104_1, 104_2, 104_3, 104_4 \ldots 104_n$ (step 1). The new SI 120 includes an indicator 302 which indicates to the MSs $104_1, 104_2, 104_3, 104_4 \ldots 104_n$ that the BSS 102 is configured to perform the optimized system access procedure to improve the capacity of the AGCH 106. The content of the new SI 120 can be limited to providing this single indicator 302 if suitable static radio parameters 134 are provided by either the legacy SI 13 message or by the immediate assignment message 132. The BSS 102 receives one or more access requests 124 on the RACH 126 from one or more MSs $104_1$ and $104_3$ (for example) which now want to transmit the SDT 130a or the IMT 130b and are requesting to establish the uplink TBF 128 (step 2) (note: the MS would send the access request 124 only if the BSS 102 is configured to perform the optimized system access procedure to improve the AGCH capacity). In response to receiving the access requests 124, the BSS 102 sends the immediate assignment message 132 on the AGCH 106 to the requesting MSs $104_1$ and $104_3$ (step 3). The immediate assignment message 132 includes a predetermined set of packet radio resources 134 (i.e., static radio parameters 134—same as the ones described in the first embodiment), and at least a portion of the dynamic radio parameters 136 (same as described in the first embodiment) both of which are to be used by the requesting MSs $104_1$ and $104_3$ when establishing the corresponding uplink TBFs 128 to transmit the corresponding SDT 130a or IMT 130b (step 4). If only one MS $104_1$ (for example) sends an access request 124 to the BSS 102 during an allowed access time interval, then the BSS 102 could choose to send a legacy immediate assignment message which includes the static radio parameters 134 and the dynamic radio parameters 136 to the individual MS $104_1$ so it can establish the uplink TBF 128 and transmit the SDT 130a or IMT 130b. Or, the BSS 102 could send the immediate assignment message 132 to the individual MS $104_1$ so it can establish the uplink TBF 128 and transmit the SDT 130a or IMT 130b.

If desired, the BSS 102 does not need to include all of the dynamic radio parameters in the immediate assignment message 132 which are needed by the requesting MSs $104_1$ and $104_3$ to establish the uplink TBFs 128. In this case, the BSS 102 would send a remaining portion of the dynamic radio parameters 136' in a message 138 on a PACCH 140 to the requesting MSs $104_1$ and $104_3$ which were addressed by the immediate assignment message 132 (step 5). Furthermore, the BSS 102 could send additional static radio parameters 134' in the message 138 (or some other message if the remaining dynamic radio parameters 136' are not sent) on the PACCH 140 to the requesting MSs $104_1$ and $104_3$ (step 5). Then, the requesting MSs $104_1$ and $104_3$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the corresponding uplink TBFs 128 to transmit the corresponding SDT 130a or IMT 130b (step 6). In any case, this process is a marked improvement over the prior art since the traditional BSS was configured to send an immediate assignment message to only one MS at a time rather than being configured as in the present invention to send an immediate assignment message 132 to multiple MSs $104_1$ and $104_3$ (for example) at the same time which improves the capacity of the AGCH 106.

Figure 2B:
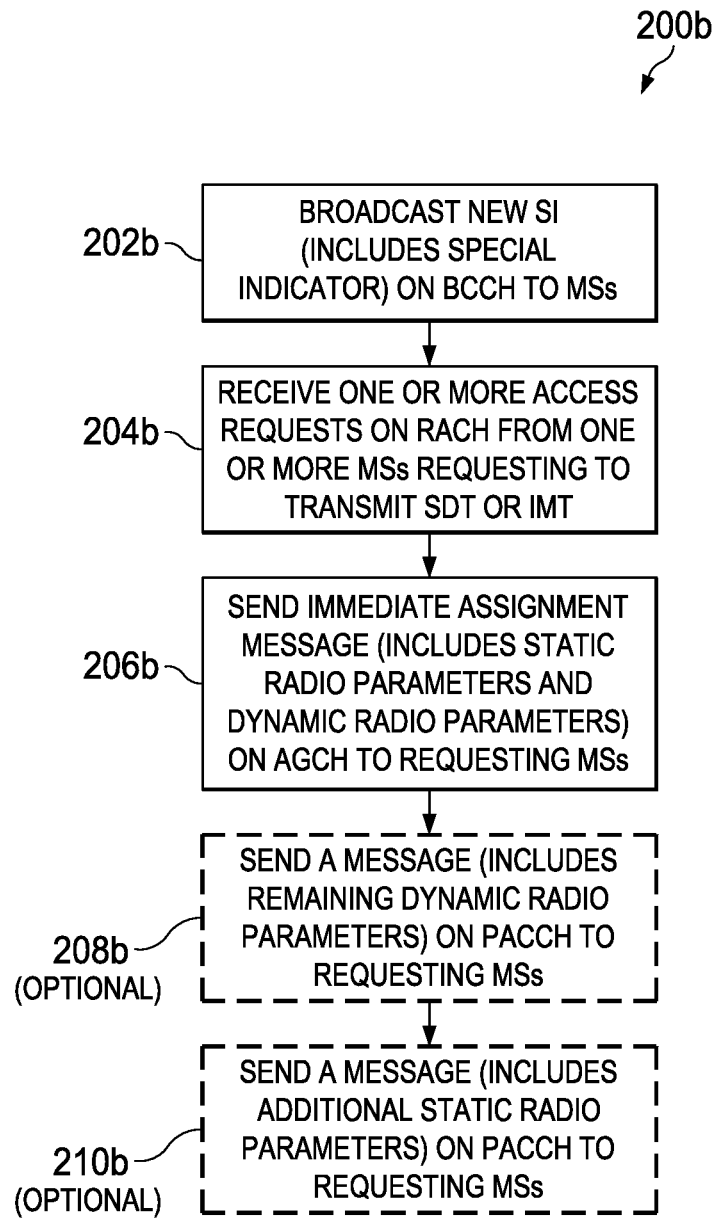

Referring to FIG. 2B, there is a flowchart of an exemplary method 200b implemented by the BSS 102 which is configured to interact with multiple MSs $104_1$, $104_2$, $104_3$, $104_4$ ... $104_n$ and perform a procedure to improve the capacity of the AGCH 106 in accordance with the second embodiment of the present invention. The BSS 102 includes the processor 110 and the memory 112 that stores processor-executable instructions where the processor 110 interfaces with the memory 112 and executes the processor-executable instructions to perform method 200b's steps as discussed next. At step 202b, the BSS 102 broadcasts the new SI 120 on the BCCH 122 to the MSs $104_1$, $104_2$, $104_3$, $104_4$ ... $104_n$. The new SI 120 includes an indicator 302 which indicates to the MSs $104_1$, $104_2$, $104_3$, $104_4$ ... $104_n$ that the BSS 102 is configured to perform the procedure to improve the capacity of the AGCH 106. At step 204b, the BSS 102 receives one or more access requests 124 (within an allowed (i.e. restricted) access time interval) on the RACH 126 from one or more MSs $104_1$ and $104_3$ (for example) which now want to transmit the SDT 130a or the IMT 130b and are requesting to establish the uplink TBF 128. In response to receiving the access requests 124, the BSS 102 at step 206b sends the immediate assignment message 132 on the AGCH 106 for the requesting MSs $104_1$ and $104_3$. The immediate assignment message 132 includes a predetermined set of packet radio resources 134 (i.e., static radio parameters 134—same as the ones described in the first embodiment), and at least a portion of the dynamic radio parameters 136 (same as described in the first embodiment) both of which are to be used by the requesting MSs $104_1$ and $104_3$ when establishing the corresponding uplink TBFs 128 to transmit the corresponding SDT 130a or IMT 130b. In the event, the BSS 102 does not include all of the dynamic radio parameters in the immediate assignment message 132 which are needed by the requesting MSs $104_1$ and $104_3$ to establish the uplink TBFs 128, then the BSS 102 at step 208b would send a remaining portion of the dynamic radio parameters 136' in a message 138 on a PACCH 140 to the requesting MSs $104_1$ and $104_3$. If desired, the BSS 102 at step 210b could send additional static radio parameters 134' in the message 138 (or some other message if the remaining dynamic radio parameters 136' are not sent) on the PACCH 140 to the requesting MSs $104_1$ and $104_3$. Then, the requesting MSs $104_1$ and $104_3$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the corresponding uplink TBFs 128 to transmit the corresponding SDT 130a or IMT 130b.

Figure 2C:
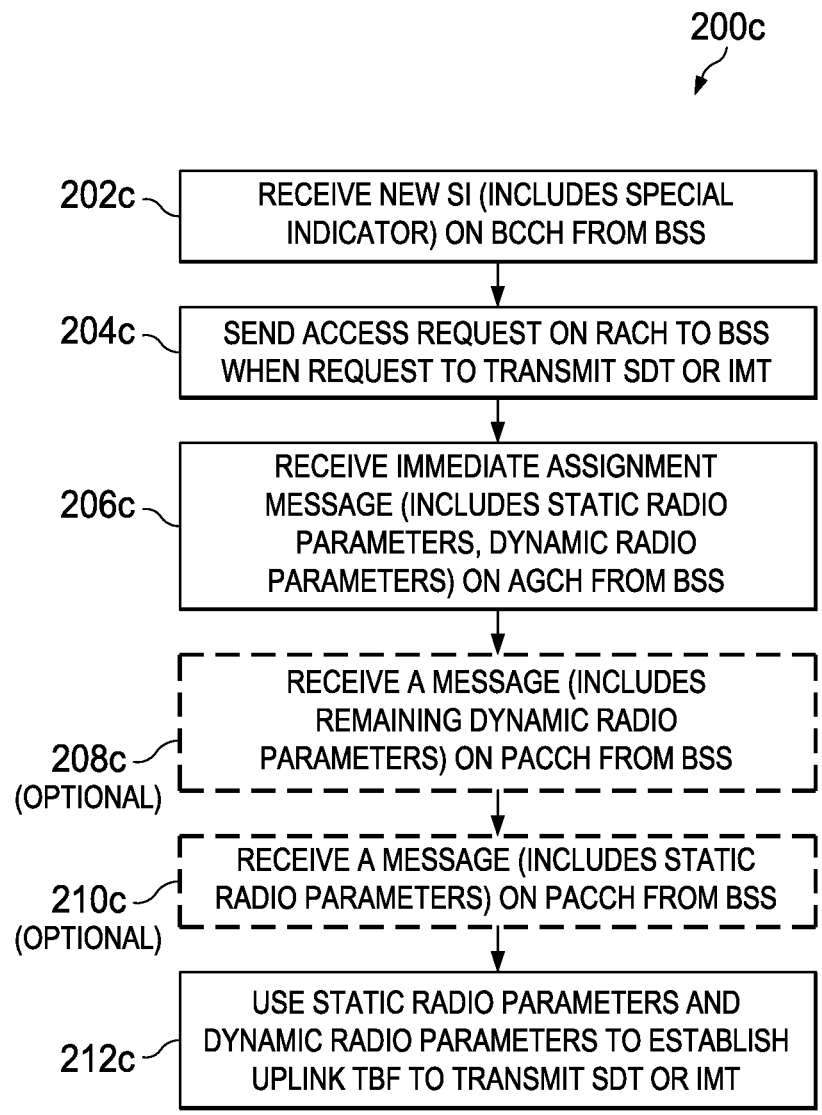

Referring to FIG. 2C, there is a flowchart of an exemplary method 200c implemented by MS $104_1$ (for example) which is configured to interact with the BSS 102 and to improve the capacity of the AGCH 106 in accordance with the second embodiment of the present invention. The MS $104_1$ includes the processor 116 and the memory 118 that stores processor-executable instructions where the processor 116 interfaces with the memory 118 and executes the processor-executable instructions to perform method 200c's steps as discussed next. At step 202c, the MS $104_1$ receives the new SI 120 on the BCCH 122 from the BSS 102. The new SI 120 includes an indicator 302 which indicates to the MSs $104_1$, $104_2$, $104_3$, $104_4$ ... $104_n$ that the BSS 102 is configured to perform the procedure to improve the capacity of the AGCH 106. At step 204c, the MS $104_1$ sends the access request 124 on the RACH 126 when requesting to establish the uplink TBF 128 that is triggered by the SDT 130a or the IMT 130b. At step 206c, the MS $104_1$ receives the immediate assignment message 132 on the AGCH 106 from the BSS 102. The immediate assignment message 132 includes a predetermined set of packet radio resources 134 (i.e., static radio parameters 134—same as the ones described in the first embodiment), and at least a portion of the dynamic radio parameters 136 (same as described in the first embodiment) both of which are to be used by the requesting MSs $104_1$ and $104_3$ when establishing the corresponding uplink TBFs 128 to transmit the corresponding SDT 130a or IMT 130b. In the event, the BSS 102 does not include all of the dynamic radio parameters in the immediate assignment message 132 which are needed by the requesting MS $104_1$ to establish the uplink TBFs 128, then the MS $104_1$ at step 208c would receive a remaining portion of the dynamic radio parameters 136' in a message 138 on a PACCH 140 from the BSS 102. Furthermore, the MS $104_1$ at step 210c could receive additional static radio parameters 134' in the message 138 (or some other message if the remaining dynamic radio parameters 136' are not sent) on the PACCH 140 from the BSS 102. At step 212c, the MS $104_1$ would use the static radio parameters 134 (and the additional static radio parameters 134' if sent), the portion of dynamic radio parameters 136 (included in the immediate assignment message 132), and the remaining portion of the dynamic radio parameters 136' (if sent in message 138) to establish the uplink TBF 128 to transmit the SDT 130a or IMT 130b.

Referring to FIG. 3A, there is a diagram illustrating the basic wireless signaling that occurs between the BSS 102 and the MSs $104_1$, $104_2$, $104_3$, $104_4$ ... $104_n$ (multiple MSs 104 shown) to improve the capacity of the AGCH 106 in accordance with the third embodiment of the present invention. As shown, the BSS 102 assigns alternative identities $302_1$, $302_2$, $302_3$, $302_4$ ... $302_n$ (temporary OSAP identities $302_1$, $302_2$, $302_3$, $302_4$ ... $302_n$) to the MSs $104_1$, $104_2$, $104_3$, $104_4$ ... $104_n$ (step 1). More specifically, MS $104_1$ is assigned alternative identity $302_1$, MS $104_2$ is assigned alternative identity $302_2$, MS $104_3$ is assigned alternative identity $302_3$, MS $104_4$ is assigned alternative identity $302_4$, and MS $104_n$ is assigned alternative identity $304_n$. The BSS 102 assigns each alternative identity $302_1$, $302_2$, $302_3$, $302_4$ ... $302_n$ to each MSs $104_1$, $104_2$, $104_3$, $104_4$ ... $104_n$ on a per cell basis such that each alternative identity $302_1$, $302_2$, $302_3$, $302_4$ ... $302_n$ is unique within a specific cell 303. In the present example, the MSs $104_1$, $104_2$, $104_3$, $104_4$ ... $104_n$ are all located within the same cell 303. In addition, the BSS 102 when assigning the alternative identities $302_1$, $302_2$, $302_3$, $302_4$ ... $302_n$ to MSs $104_1$, $104_2$, $104_3$, $104_4$ ... $104_n$ also starts a corresponding ready timer $304_1, 304_2, 304_3, 304_4 \ldots 304_n$ for each MS $104_1, 104_2, 104_3, 104_4 \ldots 104_n$ (which reflects the remaining portion of the legacy READY timer maintained by the MS and SGSN i.e. the procedures for managing the legacy READY timer remain unchanged). Each alternative identity $302_1, 302_2, 302_3, 302_4 \ldots 302_n$ remains valid while the corresponding ready timer $304_1, 304_2, 304_3, 304_4 \ldots 304_n$ is running.

The BSS 102 sends the alternative identities $302_1, 302_2, 302_3, 302_4 \ldots 302_n$ to the MSs $104_1, 104_2, 104_3, 104_4 \ldots 104_n$ (step 2). More specifically, the BSS 102 sends each alternative identity $302_1, 302_2, 302_3, 302_4 \ldots 302_n$ to each MS $104_1, 104_2, 104_3, 104_4 \ldots 104_n$ utilizing PACCH signaling 140 while a TBF is ongoing for each MS $104_1, 104_2, 104_3, 104_4 \ldots 104_n$. The BSS 102 could use the same PACCH signaling 140 to send multiple alternative identities $302_1, 302_2, 302_3, 302_4 \ldots 302_n$ to multiple MSs $104_1, 104_2, 104_3, 104_4 \ldots 104_n$ at the same time so long as the multiple MSs $104_1, 104_2, 104_3, 104_4 \ldots 104_n$ each have an ongoing TBF (this scenario not shown). Or, the BSS 102 could use different PACCH signaling 140 at different times to send one or more of the alternative identities $302_1, 302_2, 302_3, 302_4 \ldots 302_n$ to one or more of the MSs $104_1, 104_2, 104_3, 104_4 \ldots 104_n$ which happen to have an ongoing TBF (this scenario shown).

After steps 1 and 2, the BSS 102 upon receiving a downlink payload 306 (e.g., downlink payload $306_1$ and $306_3$) for at least one of the MSs $104_1, 104_2, 104_3, 104_4 \ldots 104_n$ (e.g., MSs $104_1$ and $104_3$) which are in idle mode and with alternative identities $302_1, 302_2, 302_3, 302_4 \ldots 302_n$ (e.g., alternative identities $302_1$ and $302_3$) which are still valid because their corresponding ready timers $304_1, 304_2, 304_3, 304_4 \ldots 304_n$ (e.g., ready timers $304_1$ and $304_3$) is/are still running will initiate a downlink TBF establishment by sending an immediate assignment message 132 on the AGCH 106 to the at least one of the MSs $104_1, 104_2, 104_3, 104_4 \ldots 104_n$ (e.g., MSs $104_1$ and $104_3$) (step 3). The BSS 102 can send the immediate assignment message 132 to more than one MS $104_1, 104_2, 104_3, 104_4 \ldots 104_n$ which improves the capacity of the AGCH 106 because in the past the BSS needed to send the immediate assignment message to only one MS. The immediate assignment message 132 comprises (1) the alternative identities $302_1$ and $302_3$ for the MSs $104_1$ and $104_3$, and (2) at least a portion of dynamic radio parameters 136 which are to be used by the MSs $104_1$ and $104_3$ when establishing their respective downlink TBF $308_1$ and $308_3$ to receive their respective downlink payload $306_1$ and $306_3$. The MSs $104_1$ and $104_3$ also require static radio parameters 134 and 134' and the remaining portion of the dynamic radio parameters 136' (if needed) to establish their respective downlink TBF 308 and $308_3$ in order to receive their respective downlink payload $306_1$ and $306_3$. A discussion is provided next to explain some exemplary ways on how the BSS 102 can send the static radio parameters 134 and 134' and the remaining portion of the dynamic radio parameters 136' (if needed) to the MSs $104_1$ and $104_3$.

For instance, the BSS 102 can broadcast a new SI 120 on the BCCH 122 to the MSs $104_1, 104_2, 104_3, 104_4 \ldots 104_n$ while they are in idle mode (step 4). The new SI 120 could include static radio parameters 134 which are to be used by the MSs $104_1, 104_2, 104_3, 104_4 \ldots 104_n$ whenever they experience downlink TBF establishment. It should be noted that the BSS 102 could if desired broadcast the new SI 120 to the MSs $104_1, 104_2, 104_3, 104_4 \ldots 104_n$ at any time prior to the aforementioned steps 1, 2 and/or 3. Alternatively, the BSS 102 in lieu of broadcasting the new SI 120 to the MSs $104_1, 104_2, 104_3, 104_4 \ldots 104_n$ could use different signaling to send the static radio parameters 134 to the MSs $104_1$ and $104_3$. For instance, the BSS 102 could include the static radio parameters 134 along with the dynamic radio parameters 136 in the immediate assignment message 132 which is sent to MSs $104_1$ and $104_3$.

If desired, the BSS 102 does not have to include all of the dynamic radio parameters in the immediate assignment message 132 which are needed by the MSs $104_1$ and $104_3$ to establish their downlink TBFs $308_1$ and $308_3$. In such a case, the BSS 102 would send a remaining portion of the dynamic radio parameters 136' in a supplemental message 138 (step 5) on a PACCH 140 to the MSs $104_1$ and $104_3$ which were addressed by the immediate assignment message 132 (step 3). Furthermore, the BSS 102 if desired could send additional static radio parameters 134' along with the remaining portion of the dynamic radio parameters 136' in the supplemental message 138 (step 5) on the PACCH 140 to MSs $104_1$ and $104_3$ which were addressed by the immediate assignment message 132 (step 3). Alternatively, the BSS 102 could even if there are no remaining dynamic radio parameters 136' to send to the MSs $104_1$ and $104_3$ still send additional static radio parameters 134' in the supplemental message 138 (step 5) on the PACCH 140 to MSs $104_1$ and $104_3$ which were addressed by the immediate assignment message 132 (step 3).

Thereafter, the requesting MSs $104_1$ and $104_3$ would use the static radio parameters 134 (and the additional static radio parameters 134' if sent), the portion of dynamic radio parameters 136 (included in the immediate assignment message 132), and the remaining portion of the dynamic radio parameters 136' (if sent in supplemental message 138) to establish their respective downlink TBFs $308_1$ and $308_3$ to be able to receive their respective downlink payload $306_1$ and $306_3$ (step 6). A more detailed discussion about the new SI 120, the immediate assignment message 132, the supplemental message 138, the static radio parameters 134 and 134', and the dynamic radio parameters 136 and 136' can be found in this document. Further, it should be appreciated that the BSS 102 and MSs $104_1, 104_2, 104_3, 104_4 \ldots 104_n$ can implement the features associated with the third embodiment while also implementing the features associated with the first and second embodiments.

Figure 3B:
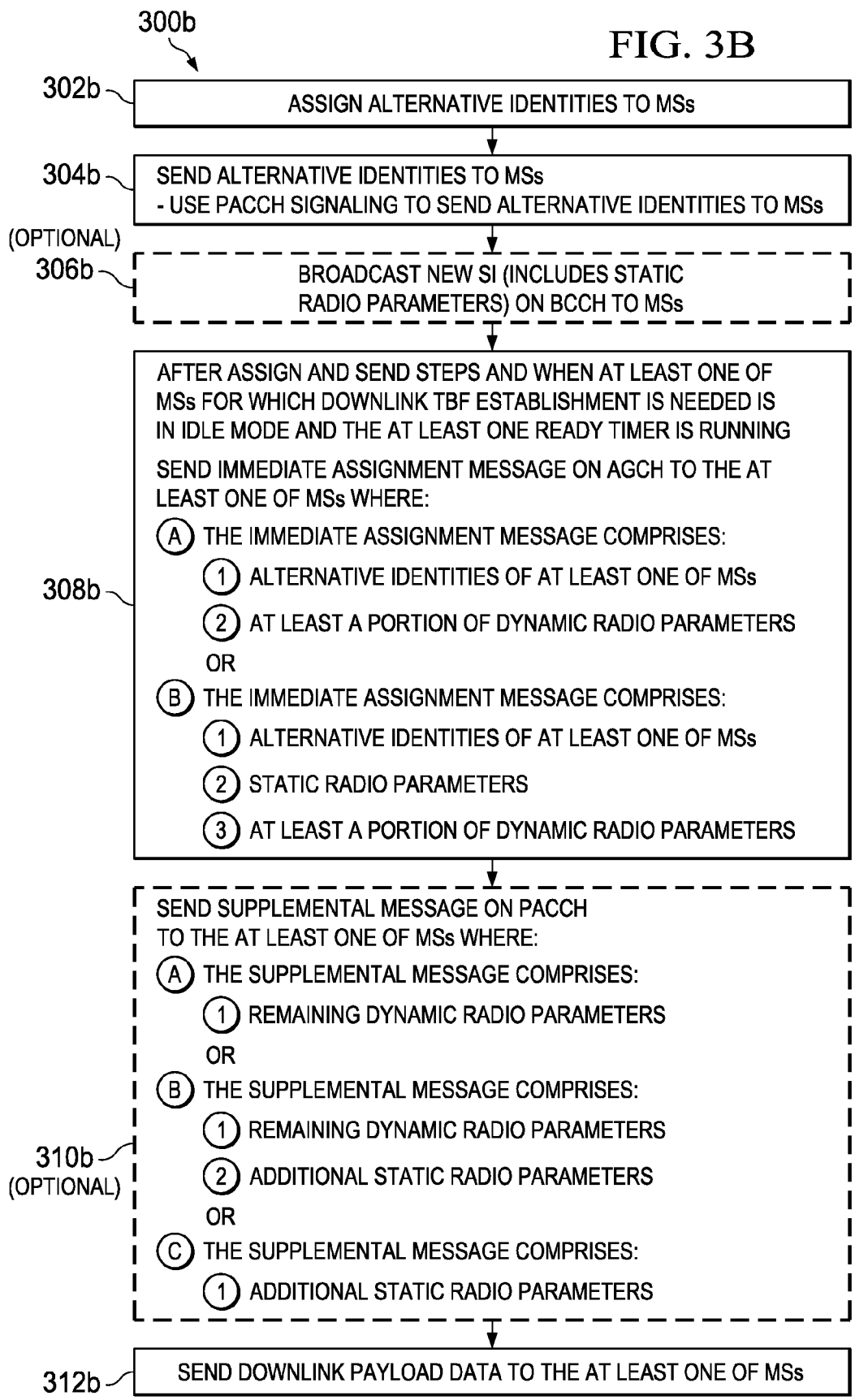

Referring to FIG. 3B, there is a flowchart of an exemplary method 300b implemented by the BSS 102 which is configured to interact with multiple MSs $104_1, 104_2, 104_3, 104_4 \ldots 104_n$ and perform a procedure to improve the capacity of the AGCH 106 in accordance with the third embodiment of the present invention. The BSS 102 includes the processor 110 and the memory 112 that stores processor-executable instructions where the processor 110 interfaces with the memory 112 and executes the processor-executable instructions to perform method 300b's steps as discussed next. At step 302b, the BSS 102 assigns alternative identities $302_1, 302_2, 302_3, 302_4 \ldots 302_n$ to the MSs $104_1, 104_2, 104_3, 104_4 \ldots 104_n$. At step 304b, the BSS 102 sends the alternative identities $302_1, 302_2, 302_3, 302_4 \ldots 302_n$ to the MSs $104_1, 104_2, 104_3, 104_4 \ldots 104_n$. At step 306b (optional), the BSS 102 broadcasts the new SI 120 on the BCCH 122 to the MSs $104_1, 104_2, 104_3, 104_4 \ldots 104_n$. The new SI 120 includes a predetermined set of packet radio resources 134 (i.e., static radio parameters 134) which are to be used by the MSs $104_1, 104_2, 104_3, 104_4 \ldots 104_n$ whenever any one of the MSs $104_1, 104_2, 104_3, 104_4 \ldots 104_n$ (e.g., MSs $104_1$ and $104_3$) when they experience downlink TBF establishment (e.g., downlink TBFs $308_1$ and $308_3$). After steps 302b, 304b and 306b (if performed), the BSS 102 upon receiving a downlink payload 306 (e.g., downlink payload $306_1$ and $306_3$) for at least one of the MSs $104_1, 104_2, 104_3, 104_4 \ldots 104_n$ (e.g., MSs $104_1$ and $104_3$) which are in idle mode and with alternative identities $302_1, 302_2, 302_3, 302_4 \ldots 302_n$ (e.g., alternative identities $302_1$ and $302_3$) which are still valid because their corresponding ready timers $304_1$, $304_2$, $304_3$, $304_4$ ... $304_n$ (e.g., ready timers $304_1$ and $304_3$) is/are still running will initiate a downlink TBF establishment at step 308b by sending the immediate assignment message 132 on the AGCH 106 to the at least one of the MSs $104_1$, $104_2$, $104_3$, $104_4$ ... $104_n$ (e.g., MSs $104_1$ and $104_3$) (note: the BSS 102 can send the immediate assignment message 132 to more than one MS $104_1$, $104_2$, $104_3$, $104_4$ ... $104_n$ which improves the capacity of the AGCH 106 because in the past the BSS needed to send the immediate assignment message to only one MS). The immediate assignment message 132 comprises at least (1) the alternative identities $302_1$ and $302_3$ for the MSs $104_1$ and $104_3$, and (2) at least a portion of dynamic radio parameters 136 which are to be used by the MSs $104_1$ and $104_3$ when establishing their respective downlink TBF $308_1$ and $308_3$. Alternatively, the immediate assignment message 132 comprises at least (1) the alternative identities $302_1$ and $302_3$ for the MSs $104_1$ and $104_3$, (2) static radio parameters 134; and (3) at least a portion of dynamic radio parameters 136 which are to be used by the MSs $104_1$ and $104_3$ when establishing their respective downlink TBF $308_1$ and $308_3$. At step 310b (optional), the BSS 102 sends a supplemental message 138 on a PACCH 140 to the requesting MSs $104_1$ and $104_3$. The supplemental message 138 comprises at least the remaining portion of the dynamic radio parameters 136'. Or, the supplemental message 138 comprises at least the remaining portion of the dynamic radio parameters 136' and additional static radio parameters 134'. Alternatively, the supplemental message 138 comprises at least the additional static radio parameters 134'. At step 312b, the BSS 102 sends the downlink payload $306_1$ and $306_3$ to the MSs $104_1$ and $104_3$. Prior to step 312b, the MSs $104_1$ and $104_3$ would have used the static radio parameters 134 (and the additional static radio parameters 134' if sent), the portion of dynamic radio parameters 136 (included in the immediate assignment message 132), and the remaining portion of the dynamic radio parameters 136' (if sent in the supplemental message 138) to establish their respective downlink TBFs $308_1$ and $308_3$ in order to receive their respective downlink payload $306_1$ and $306_3$.

Figure 3C:
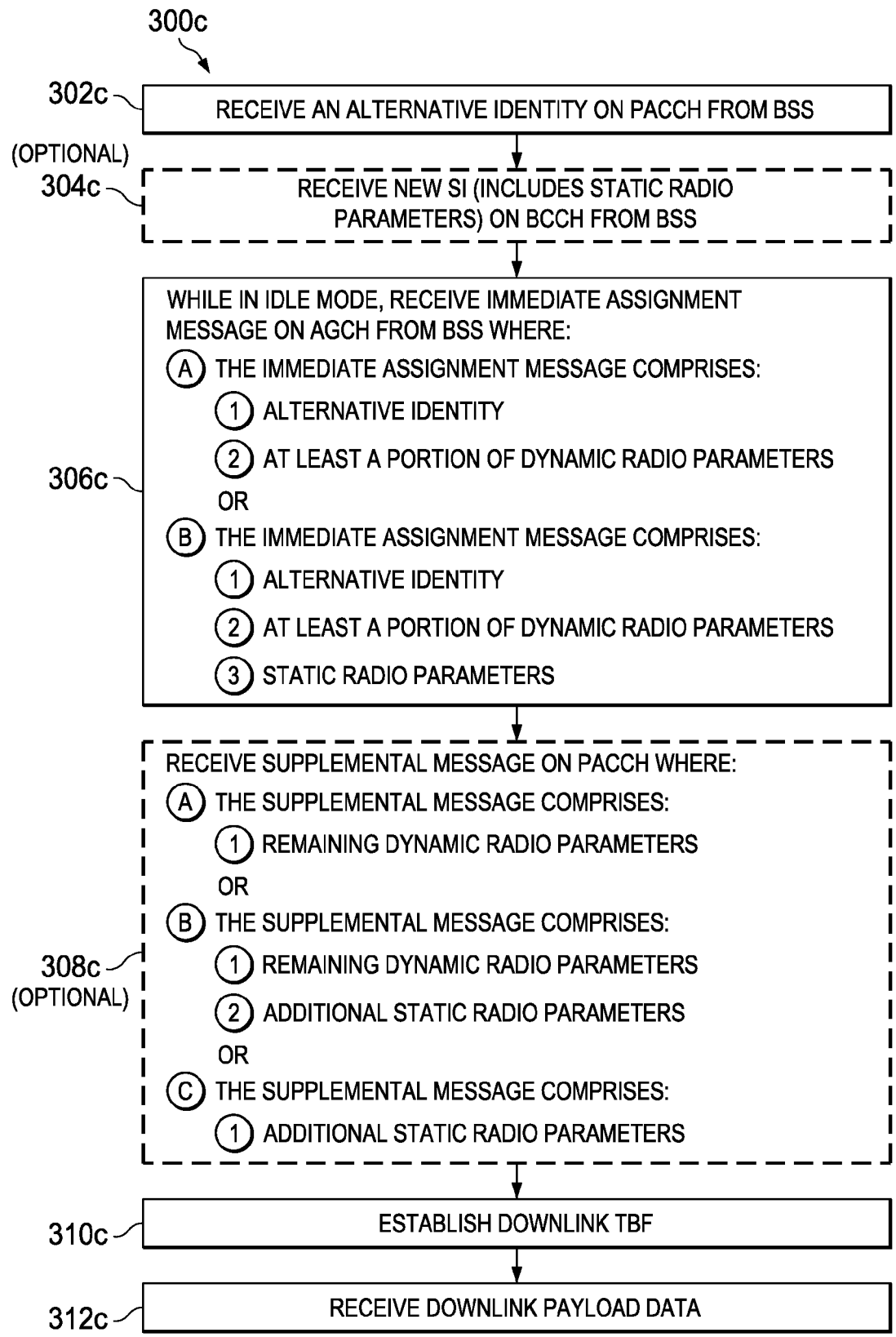

Referring to FIG. 3C, there is a flowchart of an exemplary method 300c implemented by MS $104_1$ (for example) which is configured to interact with the BSS 102 and to improve the capacity of the AGCH 106 in accordance with the third embodiment of the present invention. The MS $104_1$ includes the processor 116 and the memory 118 that stores processor-executable instructions where the processor 116 interfaces with the memory 118 and executes the processor-executable instructions to perform method 300c's steps as discussed next. At step 302c, the MS $104_1$ receives its alternative identity $302_1$ on the PACCH 140 from the BSS 102. At step 304c (optional), the MS $104_1$ while in idle mode receives the new SI 120 which includes static radio parameters 134 on the BCCH 122 from the BSS 102. At step 306c, the MS $104_1$ in idle mode receives the immediate assignment message 132 on the AGCH 106 from the BSS 102. The immediate assignment message 132 comprises at least (1) the alternative identity $302_1$ for the MS $104_1$, and (2) at least a portion of dynamic radio parameters 136 which are to be used by the MS $104_1$ when establishing the downlink TBF $308_1$. Alternatively, the immediate assignment message 132 comprises at least (1) the alternative identity $302_1$ for the MS $104_1$, (2) static radio parameters 134; and (3) at least a portion of dynamic radio parameters 136 which are to be used by the MS $104_1$ when establishing the downlink TBF $308_1$. At step 308c (optional), the MS $104_1$ could receive a supplemental message 138 on a PACCH 140 from the BSS 102. The supplemental message 138 comprises at least the remaining portion of the dynamic radio parameters 136'. Or, the supplemental message 138 comprises at least the remaining portion of the dynamic radio parameters 136' and additional static radio parameters 134'. Alternatively, the supplemental message 138 comprises at least the additional static radio parameters 134'. At step 310c, MS $104_1$ would use the static radio parameters 134 (and the additional static radio parameters 134' if sent), the portion of dynamic radio parameters 136 (included in the immediate assignment message 132), and the remaining portion of the dynamic radio parameters 136' (if sent in the supplemental message 138) to establish the downlink TBF $308_1$. At step 312c, the MS $104_1$ receives the downlink payload $306_1$ on the downlink TBF $308_1$ from the BSS 102.

The following detailed discussion describes various features and advantages associated with the present invention. In particular, the following detailed discussion is based on the disclosure in the aforementioned U.S. Provisional Application Ser. No. 61/620,696 filed on Apr. 5, 2012. In addition, the underlined portions below highlight differences between the disclosure of U.S. Provisional Application Ser. No. 61/620, 696 and an article prepared by the inventors entitled "Optimized System Access Procedure" 3GPP TSG-GERAN #54, GP-120623 and presented in Sanya, China, May 14-18, 2012. Finally, reference numerals have been added to the disclosure of U.S. Provisional Application Ser. No. 61/620,696.

"OSAP Assisted Downlink TBF Establishment"

Abstract

In light of increasing CCCH congestion problems anticipated as a result of M2M traffic and frequent small packet transmissions 130a and 130b generated by smart phones $104_1$, $104_2$, $104_3$, $104_4$ ... $104_n$ an enhanced procedure for PS domain triggered system access referred to as Optimized System Access Procedure (OSAP) is considered herein. The key objective of OSAP is to increase AGCH 106 capacity by minimizing the size of the MS specific information carried within AGCH based assignment messages 132. This can be accomplished by offloading the transmission of certain radio parameters 134 to system information 120, limiting the content 136 of the assignment messages 132 to what is strictly necessary to direct a MS $104_1$ to a packet resource and using the PACCH 140 of the packet resource to assign the MS $104_1$ any remaining information 134' and 136' it requires for uplink TBF 128 establishment. A detailed evaluation of OSAP shows that it can provide up to an eight-fold gain compared to legacy AGCH operation wherein a legacy Immediate Assignment message is assumed to assign packet resources for a single MS.

1. Introduction

Discussion of mechanisms for improving AGCH 106 capacity has been ongoing for a number of GERAN meetings with possible solutions as described in references [1] and [2]. A reasonable operational example to consider that provides motivation for the OSAP feature described herein is as follows:

The 51-multiframe format of a downlink CCCH could, for a given period of high system load, consist of an average of 4 PCH blocks and 5 AGCH blocks (i.e. in addition to the radio block used for BCCH Norm).

For a single instance of this 51-multiframe format there would be 51 RACH bursts resulting in a RACH burst to AGCH block ratio of about 10 to 1 (reduced to about 5 to 1 when factoring in the degradation of RACH performance due to collisions inherent to slotted aloha operation) which strongly suggests the AGCH will be a bottleneck.

Using IPA as a means to mitigate this imbalance results in achieving a 10 to 3 ratio (i.e. since IPA allows for up to 3 MS to be addressed by a single assignment message) but further mitigation of this imbalance is desirable if feasible (note: IPA is an alternative to OSAP and is discussed in reference [1] and later below).

For DL TBF establishment when a MS is in READY STATE, the IPA feature provides no performance increase as DL TBFs will always be established using the legacy Immediate Assignment message.

The OSAP feature described herein allows for further reducing the RACH burst to AGCH block ratio as follows:

Allowing for the inclusion of Mobile Allocation information 134 as new system information (SI) 120 to identify the subset of ARFCNs defined by the Cell Allocation to be used when frequency hopping is used in a given cell. The Mobile Allocation information 134 included as SI 120 can be referred to as "Static Radio Parameters" (SRP) 134 and would apply to packet resources assigned to mobile stations $104_1, 104_2, 104_3, 104_4 \ldots 104_n$ using OSAP.

Limiting the content of AGCH based assignment messages 132 to what is strictly necessary to direct a mobile station $104_1$ to a packet resource where it waits for a downlink PACCH message 138.

a single instance of an ATI message 138 (i.e. whereby a RACH burst to AGCH block ratio of 10 to 5 is realized). Additional analysis within this discussion paper shows that a single EIA message 132 can be used to address up to 8 different MSs $104_1, 104_2, 104_3, 104_4 \ldots 104_n$ thereby allowing for a 10 to 8 ratio to be realized using OSAP.

2. Optimized System Access Procedure—Overview

The SRP information 134 can be carried within SI 120 (e.g. using SI 21) (according to the first embodiment of the present invention). Or, the SI 120 will at minimum provide an indication 302 (according to the second embodiment of the present invention). In any case, the SI 120 indicates when a serving cell supports the Optimized System Access Procedure (OSAP) wherein the corresponding BSS 102 is capable of receiving a new RACH burst 124 that involves the use of a new training sequence code (TSC). The reception of an access request message 124 known as an Enhanced Packet Channel Request 124 (EPCR) sent using this new TSC allows for introducing new OSAP specific code points in the 11-bit EPCR message as per TABLE 3 below.

TABLE 3

ENHANCED PACKET CHANNEL REQUEST 124 message content

< Enhanced Packet channel request message content > ::=
    < OSAP Request - one phase access :          00       < Priority : bit (2) >
                                                                              < MultislotClassGroup : bit (3) >
                                                                              < RandomBits : bit (4) > >
    < OSAP Request - signalling :                  01000 < Priority : bit (2) >
                                                                              < RandomBits : bit (4) > >
    < OSAP Request - single block packet access :   01001 < Priority : bit (2) >
                                                                               < RandomBits : bit (4) > >
    < OSAP Request - two phase access :        01010 < Priority : bit (2) >
                                                                               < RandomBits : bit (4) > >;

Sending a PACCH message 138 on the downlink of the assigned packet resource to provide a MS $104_1$ with all additional information 134' and 136' needed to complete the establishment of either an uplink TBF 128 or downlink TBF.

Introducing a new AGCH message 132 referred to as an Enhanced Immediate Assignment (EIA) message 132 and a new PACCH message 138 referred to as an Additional TBF Information (ATI) message 138.

Figure 4D:
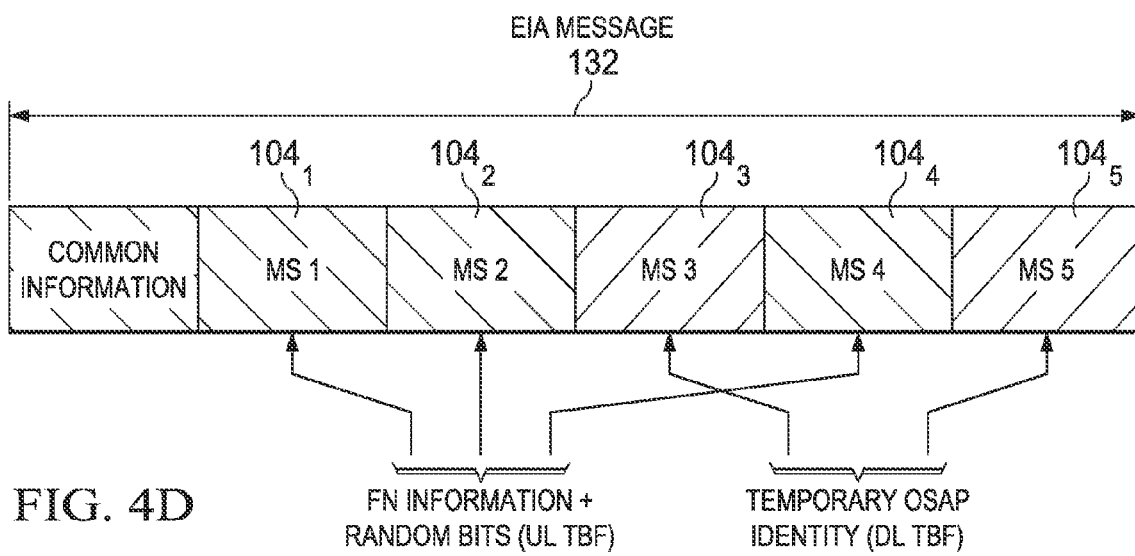
FIGS. 4A-4D are several diagrams associated with the disclosure in the aforementioned U.S. Provisional Application Ser. No. 61/620,696 which are used to help explain the wireless signaling that occurs between the BSS and multiple MSs to improve the capacity of the AGCH in accordance with various embodiments of the present invention.
Figure 4A:
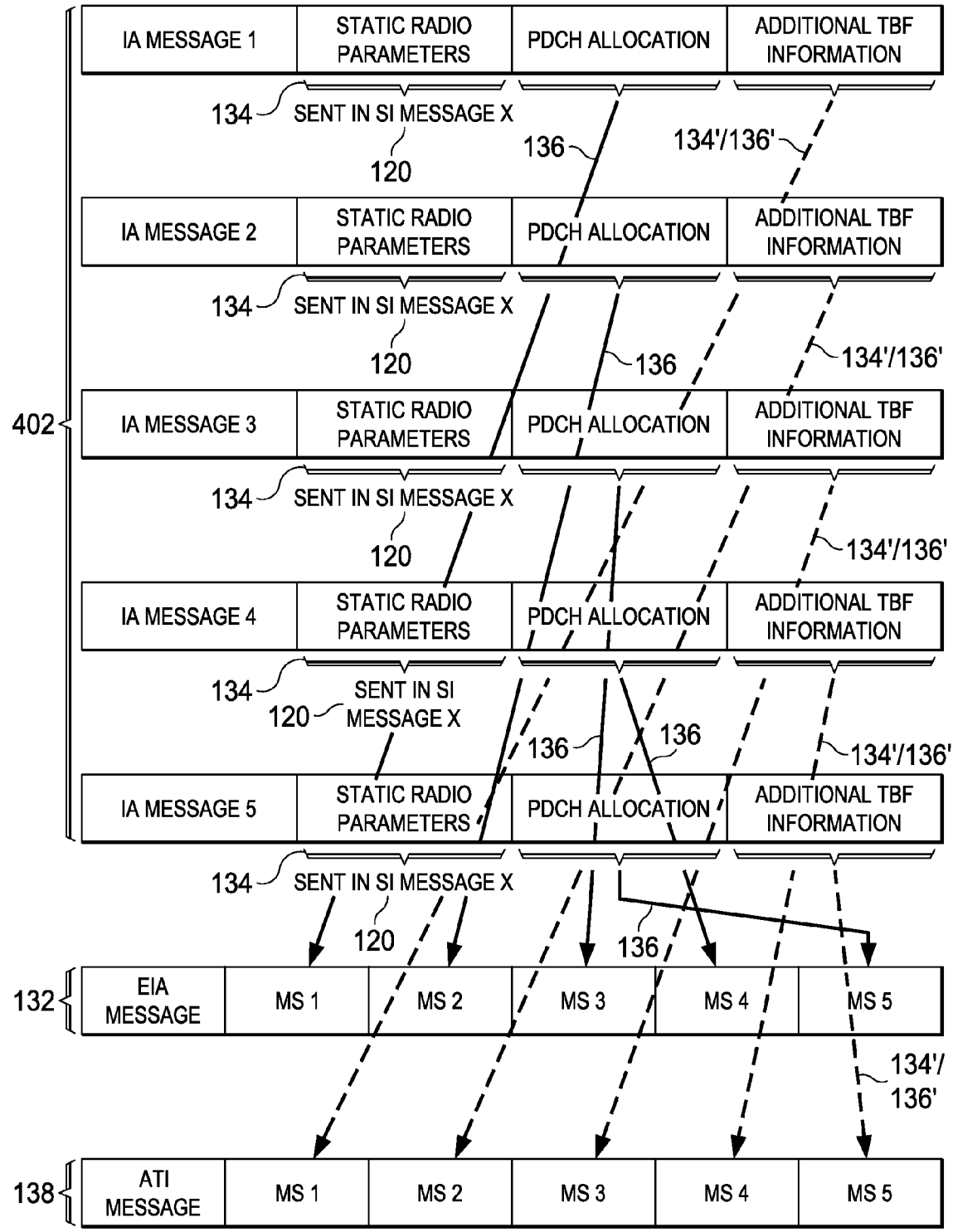

FIG. 4A shows an example according to the first embodiment of the present invention of how the content of 5 legacy IA messages 402 can be effectively distributed within (a) system information 120, (b) a single EIA message 132 and (c)

Figure 4B:
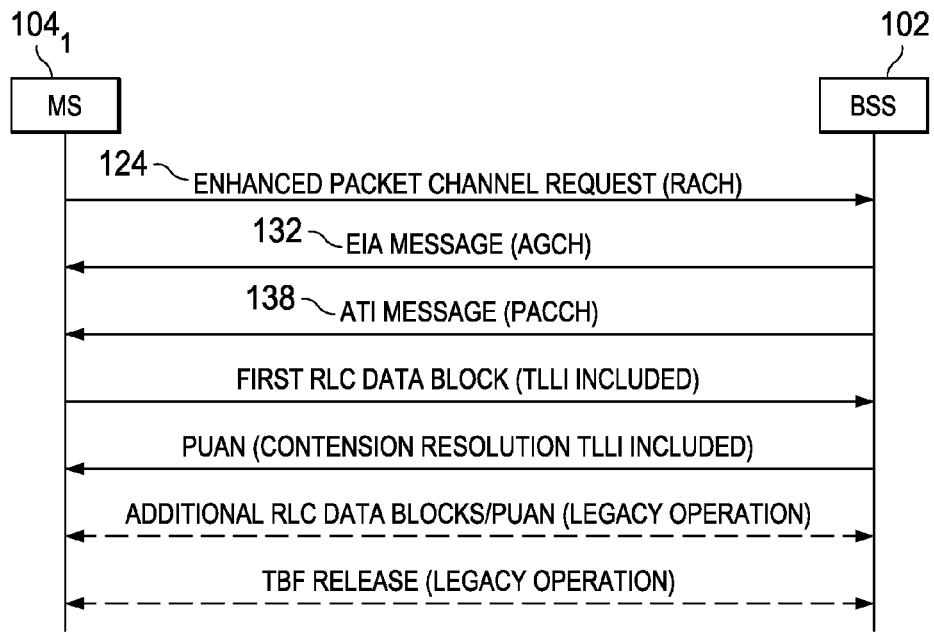

The basic signaling events associated with an OSAP based system access for uplink TBF 128 establishment wherein a one phase access is used are shown in FIG. 4B.

3. Analysis of the Legacy Immediate Assignment Message Content

The content of the legacy Immediate Assignment message is examined below on a per information element basis to identify which information must still be included within the OSAP specific EIA message 132 sent on the AGCH 106 and which information can be sent later using one or more OSAP specific ATI message 138 instances sent on the PACCH 140 (i.e. that supplements the packet resource information provided by the OSAP specific assignment message 132).

TABLE 4

Legacy IMMEDIATE ASSIGNMENT message content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | Immediate Assignment Message Type | Message Type 10.4 | M | V | 1 |
| | Page Mode | Page Mode 10.5.2.26 | M | V | ½ |

TABLE 4-continued

Legacy IMMEDIATE ASSIGNMENT message content

| IEI | Information element | Type/Reference | Presence | Format | length |
|---|---|---|---|---|---|
| | Dedicated mode or TBF | Dedicated mode or TBF 10.5.2.25b | M | V | ½ |
| | Channel Description | Channel Description 10.5.2.5 | C | V | 3 |
| | Packet Channel Description | Packet Channel Description 10.5.2.25a | C | V | 3 |
| | Request Reference | Request Reference 10.5.2.30 | M | V | 3 |
| | Timing Advance | Timing Advance 10.5.2.40 | M | V | 1 |
| | Mobile Allocation | Mobile Allocation 10.5.2.21 | M | LV | 1-9 |
| 7C | Starting Time | Starting Time 10.5.2.38 | O | TV | 3 |
| | IA Rest Octets | IA Rest Octets 10.5.2.16 | M | V | 0-11 |

Page Mode: This content of this legacy IE is included within the Page Mode IE of the EIA message 132 shown in TABLE 6. This IE allows for informing a MS not addressed by the EIA message 132 about possible extended paging operation and is therefore not deferrable to an ATI message 124.

Dedicated mode or TBF: Not required since the system access scenario considered herein is always associated with TBF establishment.

Channel Description: Not required since it is associated with identifying a TCH.

Packet Channel Description: An enhanced version of this legacy IE is included within the Packet Channel Description IE of the EIA message 132 as shown in TABLE 6 (i.e. the enhanced version consists of the legacy IE with the Channel type field and the spare bits removed). This IE provides the basic amount of information required by a mobile station $104_1$ to identify the assigned packet resources and is therefore not deferrable to an ATI message 138.

Request Reference: An enhanced version of this legacy IE is included in the EIA message 132 where similar information is carried using the MS Specific EIA Parameters IE as shown in TABLE 6. This information is used for the purpose of contention resolution and is therefore not deferrable to an ATI message 138.

Timing Advance: Included in an ATI message 138 instance sent on the PACCH 140.

Mobile Allocation: Can be included in the SRP information 134 sent on BCCH 122 or included in the EIA message 132. If frequency hopping is applied, the mobile station $104_1$ uses the last Cell Allocation received on SI1 to decode the Mobile Allocation.

Starting Time: Included in an ATI message 138 instance sent on the PACCH 140.

IA Rest Octets: An enhanced version of this legacy IE is included in an ATI message 138 instance where similar information is carried using the MS Specific TBF Parameters IE as shown in TABLE 7 (i.e. the enhanced version of this legacy IE eliminates the CSN.1 extension mechanism used for indicating information on a per release basis).

4. SRP Information Content

The SRP information 134 can be carried within SI 120 (e.g. using SI 21) (according to the first embodiment of the present invention). Or, the SI 120 will at minimum provide an indication 302 (according to the second embodiment of the present invention). In any case, the SI 120 indicates that a serving cell supports OSAP based system access and Mobile Allocation information (optional). If frequency hopping is used then the Mobile Allocation information indicates the subset of RF channels belonging to the Cell Allocation used in the frequency hopping sequence.

A maximum of 8 octets is needed to include SRP information 134 within an SI message 120 (i.e. a cell allocation can at most consist of 64 ARFCNs).

When SRP 134 information or the indicator 302 is included within an SI message 120 a single instance of OSAP Mobile Allocation information is seen as being sufficient for the packet radio resources that can be assigned using the OSAP procedure.

For example, the following structure could be added as a Rel-12 extension to the SI 21 message 120.

```
{ 0 | 1 -- OSAP based system access procedure supported
    { 0 -- OSAP Mobile Allocation not included as part of system
    information
        | 1 < Number of Octets : bit (3) >
    { < OSAP Mobile Allocation : bit (8) > } * (val(Number of
    Octets)+1)
    }
};
```

Each bit of each OSAP Mobile Allocation octet corresponds to a specific frequency in the Cell Allocation frequency list as currently described for the legacy Mobile Allocation information element.

5. Enhanced Immediate Assignment (EIA) Message 132 Content

This message 132 is formatted as shown in TABLE 5 below and is sent on the AGCH 106 by the network to provide mobile stations $104_1$, $104_2$, $104_3$, $104_4$ ... $104_n$ with a minimum amount of packet resource information 134 (i.e. as a result of receiving this information a MS $104_1$ can only receive PACCH messages 138 on the packet resources assigned by the EIA message 132 and must therefore wait until it receives additional TBF related information 134' and 136' on the PACCH 138 before an uplink TBF 128 can be used for payload transmission or payload can be received on a downlink TBF).

TABLE 5

ENHANCED IMMEDIATE ASSIGNMENT message 132 content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | Enhanced Immediate Assignment Message Type | Message Type 10.4 | M | V | 1 |
| | EIA Rest Octets | EIA Rest Octets 10.5.2.xx | M | V | 1 ... 20 |

The length (in octets) of all information provided by the EIA Rest Octets IE and the value provided by the L2 Pseudo Length IE has a maximum value of 22 (see TABLE 5 above). The L2 pseudo length indicates the sum of the lengths of all information elements present in the EIA message 132 except the EIA Rest Octets IE and the L2 Pseudo Length IE itself and as such has a value of 2. This leaves a maximum of 20 octets (160 bits) of space available for the EIA Rest Octets IE.

One instance of the EIA Rest Octets IE is included per EIA message 132 and consists of the fields shown in TABLE 6 below where these fields are used as follows:

Page Mode (2 bits): One instance is included per EIA message 132.

Implicit Reject CS (1 bit): One instance is included per EIA message 132. Note that this is included so that an OSAP capable MS $104_1$, $104_2$, $104_3$, $104_4$ ... $104_n$ configured for LAP can detect an Implicit Reject for the CS domain when it happens to read an EIA message 132 on the AGCH 106 while attempting a non-OSAP system access for the CS domain.

Implicit Reject PS (1 bit): One instance is included per EIA message 132. Note that this is included so that an OSAP capable MS $104_1$, $104_2$, $104_3$, $104_4$ ... $104_n$ configured for LAP can detect an Implicit Reject for the PS domain when it reads an EIA message 132 on the AGCH 106 that does not provide matching FN Information+Random Bits.

Message Reference ID (2 bits): One instance is included per EIA message 132. This information is included so that a MS $104_1$, $104_2$, $104_3$, $104_4$ ... $104_n$ can compare the value of the Message Reference ID received in a subsequent ATI message 138 instance against the value received in the EIA message 132 and thereby verify when it has received an ATI message 138 instance that supplements a previously received EIA message 132.

Packet Channel Description (18 or 19): One instance is included per EIA message 132 (i.e. it is common to all MSs $104_1$, $104_2$, $104_3$, $104_4$ ... $104_n$ addressed by the EIA message 132) and its content is the same as per the legacy Packet Channel Description IE (see TABLE 6 below).

Mobile Allocation (1, 11, 19, 27 or 35): One instance may be included per EIA message 132 (i.e. when included it is common to all MS $104_1$, $104_2$, $104_3$, $104_4$ ... $104_n$ addressed by the EIA message 132) and it is limited to providing 32 bits Mobile Allocation information. If more than 32 bits of Mobile Allocation information is needed or Mobile Allocation information is sent using system information 120 (i.e. SRP 134) then this information is not included in the EIA message 132.

FN Information Length (2 bits): One instance is included per EIA message 132 and allows for 4 different lengths of FN Information to be indicated.

Temporary OSAP Identity Length (2 bits): One instance is included per EIA message 132 and allows for 4 different lengths of Temporary OSAP Identity to be indicated.

FN Information (Z bits=val(FN Information Length)+9): One instance is included per MS $104_1$, $104_2$, $104_3$, $104_4$ ... $104_n$ addressed by the EIA message 132 for the purpose of uplink TBF 128 establishment.

FN Information=the binary value of 'FN modulo X' where FN=the TDMA frame number of the burst in which an Enhanced Packet Channel Request 124 was received on the RACH 126 by the BSS 102.

X can be set to reflect an acceptable probability for TDMA frame number collision. For example, for X=256 (Z=8 bits) the time between uplink bursts for which FN mod 256 has the same value is 1.18 sec (i.e. each TDMA frame=4.615 ms, 256*4.615=1.18).

This means there will be some degree of uncertainty on behalf of mobile stations $104_1$, $104_2$, $104_3$, $104_4$ ... $104_n$ regarding whether or not matching 'FN Information' they receive in an EIA message 132 really reflects the specific burst in which they sent their access request message on the RACH 126.

The length of the MS specific FN information (Z bits) included in an EIA message 132 is variable allowing for operators to increase/decrease the probability of TDMA FN collision to a level they are comfortable with.

Random Bits (4 bits): One instance is included per MS $104_1$, $104_2$, $104_3$, $104_4$ ... $104_n$ addressed by the EIA message 132 and has a corresponding instance of the FN Information field (i.e. corresponding instances of FN Information and Random Bits sent in an EIA message 132 are a reflection of the "Z" least significant bits of the TDMA FN and Random Bits received by the BSS 102 within an earlier EPCR message 124).

Temporary OSAP Identity (Y bits=val(Temporary OSAP Identity Length)+9): One instance is included per MS $104_1$, $104_2$, $104_3$, $104_4$ ... $104_n$ addressed by the EIA message 132 for the purpose of downlink TBF establishment. It allows for an EIA message 132 to identify each mobile station $104_1$, $104_2$, $104_3$, $104_4$ ... $104_n$ based on its specific Temporary OSAP Identity. If a MS $104_1$, $104_2$, $104_3$, $104_4$ ... $104_n$ has not been assigned a Temporary OSAP Identity then legacy procedures are used for downlink TBF establishment.

TABLE 6

EIA Rest Octets Information Element

```
< EIA Rest Octets > ::=
< Page Mode : bit (2) >
< Implicit Reject CS : bit >
< Implicit Reject PS : bit >
< Message Reference ID : bit (2) >
< Packet Channel Description : < Packet Channel Description struct > >
{ 0 | 1    < Mobile Allocation Length : bit (2) >
           < Mobile Allocation : bit (8 * ( val(Mobile Allocation
           Length) + 1)) > }
< FN Information Length : bit (2) >
< Temporary OSAP Identity Length : bit (2) >
{ 1      < MS Specific EIA Parameters : < MS Specific EIA Parameters
struct > > } ** 0 <spare padding> ;
< Packet Channel Description struct> ::=
< TN : bit (3) >
< TSC : bit (3) >
{ 0
     { 0     < ARFCN : bit (10) >    -- non-hopping RF channel
     configuraion
       | 1     < MAIO : bit (6) >    -- indirect encoding of
hopping RF channel configuration
                 < MA_NUMBER_IND : bit >
                 { 0 | 1 < CHANGE_MARK_1 : bit (2) > }
     }
     | 1
         < MAIO : bit (6) >         -- direct encoding of
hopping RF channel configuration
         < HSN : bit (6) >
} ;
< MS Specific EIA Parameters struct> ::=
{ 0      < FN information : bit (val(FN Information Length) + 9) >
         < Random Bits : bit (4) >
  | 1    < Temporary OSAP Identity : bit (val(Temporary OSAP
Identity Length) + 9) >
} ;
```

EIA Example 1

The EIA message 132 is used only for the case of uplink TBF 128 establishment where FN Information provided for each MS 104₁, 104₂, 104₃, 104₄ ... 104ₙ addressed by the EIA message 132 is 9 bits long (i.e. Z=9, X=512). In this case all MS 104₁, 104₂, 104₃, 104₄ ... 104ₙ making access requests 124 within a TDMA frame where the 9 least significant bits of that TDMA frame matches the FN Information sent in the EIA message 132 will then look at the corresponding Random Bits field to determine if they have received a response that matches their access request 124. Note that in this case the TDMA frames having the same 9 least significant bits will be a multiple of 2.36 sec apart (i.e. 512*4.615 ms=2.36 s).

The EIA message 132 content specific to each addressed MS=FN Information (9)+Random Bits (4)+MS ID Discriminator (1)=14 bits.

The EIA message 132 content for which a single instance is included (regardless of how many MS 104₁, 104₂, 104₃, 104₄ ... 104ₙ are addressed)=Page Mode (2)+Implicit Reject CS (1)+Implicit Reject PS (1)+Message Reference ID (2)+Packet Channel Description (19)+Mobile Allocation (1)+FN Information Length (2)+Temporary OSAP Identity Length (2)=30 bits.

The maximum number of MS 104₁, 104₂, 104₃, 104₄ ... 104ₙ addressed per EIA message 132=8 (i.e. 8*14+30=142).

According to TABLE 6 above 10 bits of CSN.1 overhead are required for the EIA message 132 (1 bit to indicate no mobile allocation is included, 1 bit for each of the 8 instances of the MS Specific EIA Parameters IE included in the message and 1 bit to indicate the "direct encoding of hopping RF channel configuration" is used).

The resulting EIA message 132 has a total length of 152 bits.

EIA Example 2

This example builds on EIA example 1 above except that it allows for 10 bits of FN Information (i.e. Z=10, X=1024) for each MS 104₁, 104₂, 104₃, 104₄ ... 104ₙ addressed by the EIA message 132. In this case all MS 104₁, 104₂, 104₃, 104₄ ... 104ₙ making access requests 124 within a TDMA frame where the 10 least significant bits of that TDMA frame matches the FN Information sent in the EIA message 132 will then look at the corresponding Random Bits field to determine they have received a response that matches their access request 124. Note that in this case the TDMA frames having the same 10 least significant bits will be a multiple of 4.72 sec apart (i.e. 1024*4.615 ms=4.72 s).

The EIA message 132 content specific to each addressed MS=FN Information (10)+Random Bits (4)+MS ID Discriminator (1)=15 bits.

The EIA message 132 content for which a single instance is included (regardless of how many MS are addressed)=Page Mode (2)+Implicit Reject CS (1)+Implicit Reject PS (1)+Message Reference ID (2)+Packet Channel Description (19)+Mobile Allocation (1)+FN Information Length (2)+Temporary OSAP Identity Length (2)=30 bits.

The maximum number of MS 104₁, 104₂, 104₃, 104₄ ... 104ₙ addressed per EIA message 132=8 (i.e. 8*15+30=150).

According to TABLE 6 above 10 bits of CSN.1 overhead are required for the EIA message 132 (1 bit to indicate no mobile allocation is included, 1 bit for each of the 8 instances of the MS Specific EIA Parameters IE included in the message and 1 bit to indicate the "direct encoding of hopping RF channel configuration" is used).

The resulting EIA message 132 has a total length of 160 bits.

EIA Example 3

This example builds on example 2 above except that it allows for 24 bits of Mobile Allocation information to be included within the EIA message 132.

The EIA message 132 content specific to each addressed MS=FN Information (10)+Random Bits (4)+MS ID Discriminator (1)=15 bits.

The EIA message 132 content for which a single instance is included (regardless of how many MS are addressed)=Page Mode (2)+Implicit Reject CS (1)+Implicit Reject PS (1)+Message Reference ID (2)+Packet Channel Description (19)+Mobile Allocation (27)+FN Information Length (2)+Temporary OSAP Identity Length (2)=56 bits.

The maximum number of MS 104₁, 104₂, 104₃, 104₄ ... 104ₙ addressed per EIA message 132=6 (i.e. 6*15+56=146).

According to TABLE 6 above 8 bits of CSN.1 overhead are required for the EIA message 132 (1 bit to indicate a mobile allocation is included, 1 bit for each of the 6 instances of the MS Specific EIA Parameters IE included in the message and 1 bit to indicate the "direct encoding of hopping RF channel configuration" is used).

The resulting EIA message 132 has a total length of 154 bits

6. Additional TBF Information (ATI) Message 138 Content

This message 138 is formatted as shown in TABLE 7 below and is sent on the PACCH 140 by the network to provide mobile stations $104_1$, $104_2$, $104_3$, $104_4$ ... $104_n$ with additional information 134' and 136' required for uplink TBF 128 or downlink TBF establishment. A set of one or more ATI message 138 instances can be sent by the BSS 102 where each instance in the set corresponds to the same EIA message 132 and is carried within a single PACCH block. This will minimize the amount of information any given MS $104_1$, $104_2$, $104_3$, $104_4$ ... $104_n$ addressed by a given EIA message 132 must receive within the EIA message 132. Note that until a MS receives an ATI message 138 instance containing information that supplements the information it previously received in an EIA message 132 it can only receive on the downlink PACCH 140 the packet resources assigned by the EIA message 132. The content of this message 138 consists of the following:

MS Specific TBF Parameters (X bits): One instance is included per MS $104_1$, $104_2$, $104_3$, $104_4$ ... $104_n$ addressed by an ATI message 138.

Page Mode (2 bits): One instance is included per ATI message 138.

Message Reference ID (2 bits): One instance is included per ATI message 138. This information is included so that a MS $104_1$, $104_2$, $104_3$, $104_4$ ... $104_n$ can compare it to the value in the previously received EIA message 132 and thereby verify when it has received an ATI message 138 that corresponds to the EIA message 132 in which it detected matching FN Information and Random Bits.

MS Assignment Bitmap (8 bits): One instance is included per ATI message 138. This bitmap indicates which subset of MS addressed by a given EIA message 132 are assigned resources by a received ATI message 138. Depending on the amount of MS specific information required, multiple ATI messages 138 corresponding to the same EIA message 132 can be sent. The net result is that the "Nth" MS $104_1$, $104_2$, $104_3$, $104_4$ ... $104_n$ addressed by an EIA message 132 will only have to correctly receive one corresponding ATI message 132 instance (i.e. the ATI message instance having a MS Assignment Bitmap with a "1" in bit position "N").

Figure 4C:
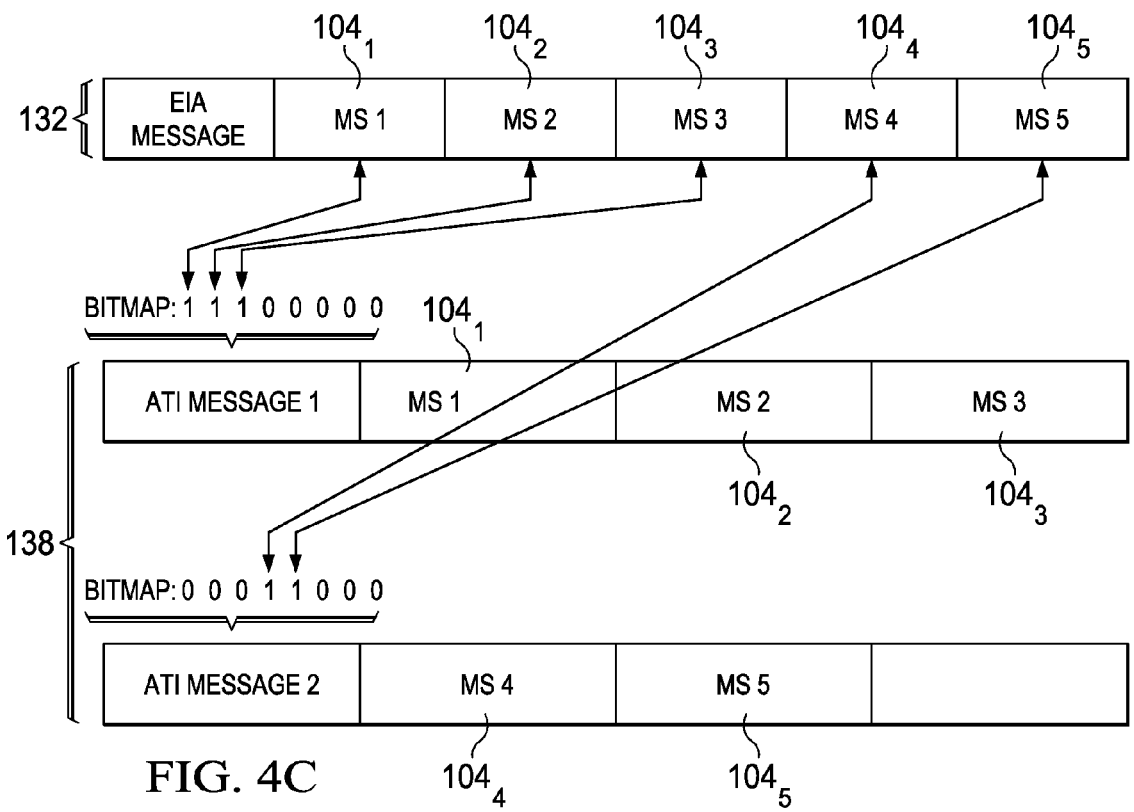

For example, if we assume that 5 MS $104_1$, $104_2$, $104_3$, $104_4$, $104_5$ are addressed in a given EIA message 132 then 2 corresponding ATI message 138 instances can be sent where ATI message instance 1 addresses MS1, MS2 and MS3 and ATI message instance 2 addresses MS4 and MS5 as per FIG. 4C. Thus any combination of up to 8 MSs $104_1$, $104_2$, $104_3$, $104_4$ ... $104_n$ can be addressed in the set of ATI message 138 instances corresponding to the same EIA message 132.

The number of MS $104_1$, $104_2$, $104_3$, $104_4$ ... $104_n$ addressed by the MS Specific TBF Parameters IE included in a given ATI message 138 instance can therefore be a subset of the total number of MS $104_1$, $104_2$, $104_3$, $104_4$ ... $104_n$ addressed by the MS Specific EIA Parameters IE included in the EIA Rest Octets IE (see TABLE 6) carried within the corresponding EIA message 132. The ordering of MS addressed by the MS Specific TBF Parameters IE included in a given ATI message 138 instance will therefore be determined by the MS Assignment Bitmap IE.

TABLE 7

Additional TBF Information (ATI) Message 138
< Additional TBF Information message content > ::=
< PAGE_MODE : bit (2) >
< Message Reference ID : bit (2) >
< MS Assignment Bitmap : bit (8) >
{ 1     < MS Specific TBF Parameters : < MS Specific TBF Parameters struct > > } ** 0
<spare padding>;
< MS Specific TBF Parameters struct> ::=
{ 00         < EGPRS Packet Uplink Assignment >
     | 01    < Packet Uplink Assignment >
     | 10    < Packet Downlink Assignment >
     | 11    - reserved
} ;
< EGPRS Packet Uplink Assignment > : :=
{ 0 | 1 < Access Technologies Request : Access Technologies Request struct > }
{ 0     -- one phase access indication
         < TFI_ASSIGNMENT : bit (5) >
         < POLLING : bit >
         21 USF: bit (3) >
         < USF_GRANULARITY : bit >
         { 0 | 1 < P0 : bit (4) >
         < PR_MODE : bit (1) > }
         < EGPRS CHANNEL_CODING_COMMAND : < EGPRS Modulation and
Coding Scheme IE >>
         < TLLI_BLOCK_CHANNEL_CODING : bit (1) >
         { 0 | 1 < BEP_PERIOD2 : bit (4) > }
         < RESEGMENT : bit (1) >
         < EGPRS Window Size : < EGPRS Window Size IE >> -- 5 bits
         { 0 | 1 < ALPHA : bit (4) > }
         < GAMMA : bit (5) >
         { 0 | 1 < TIMING_ADVANCE_INDEX : bit (4) > }
         { 0 | 1 < TBF_STARTING_TIME : bit (16) > }
         { 0         -- '0' indicates that FANR is not activated
            | 1      -- '1' indicates that FANR is activated
               { 0          -- SSN-based encoding is selected
                  | 1       -- Time-based encoding is selected
                     < REPORTED TIMESLOTS : bit (8) >
                     < TSH : bit (2) > } }

TABLE 7-continued

```
            | 1     -- An uplink RTTI TBF is assigned
                    < RTTI USF Mode : bit(1) >
                    < PDCH PAIR INDICATION: bit(3) >
                              < Additional_USF : bit (3) >*(1-val(RTTI USF
MODE))
                    { 0                              -- One PDCH Pair assigned
                         | 1    < USF2 : bit(3)>           -- Two PDCH Pairs
assigned
                              < Additional_USF2 : bit (3) >*(1-val(RTTI USF
MODE)) }
                    { 0           -- SSN-based encoding is selected
                         | 1      -- Time-based encoding is selected
                                  < REPORTED TIMESLOTS : bit (8) >
                                  < TSH : bit (2) > }
       | 1     -- two phase access indication (Multi Block Allocation)
               { 0 | 1 < ALPHA : bit (4) > }
               < GAMMA : bit (5) >
               < TBF_STARTING_TIME : bit (16) >
               < NUMBER OF RADIO BLOCKS ALLOCATED : bit (2) >
               { 0 | 1 < P0 : bit (4) >
                      < PR_MODE : bit (1) > }
}
{ 0 | 1 < PFI : bit (7) > } ;
<Access Technologies Request struct> ::=
       -- recursive structure allows any combination of Access technologies
       < Access Technology Type : bit (4) >
       { 0 | 1 <Access Technologies Request struct> } ;
< Packet Uplink Assignment > ::=
{ 0   -- one phase access
       < TFI_ASSIGNMENT : bit (5) >
       < POLLING : bit >
       < USF: bit (3) >
       < USF_GRANULARITY : bit >
       { 0 | 1 < P0 : bit (4) >
             PR_MODE : bit (1) > }
       < CHANNEL_CODING_COMMAND : bit (2) >
       < TLLI_BLOCK_CHANNEL_CODING : bit >
       { 0 | 1 <ALPHA : bit (4) > }
       < GAMMA : bit (5) >
       { 0 | 1 < TIMING_ADVANCE_INDEX : bit (4) > }
       { 0 | 1 < TBF_STARTING_TIME : bit (16) > }
       | 1       -- two phase access indication (Single Block Allocation)
                { 0 | 1 < ALPHA : bit (4) > }
                < GAMMA : bit (5) >
                < TBF_STARTING_TIME : bit (16) >
                { L | H < P0 : bit (4) >
                      < PR_MODE : bit (1) > }
}
{ 0 | 1 < PFI : bit (7) > } ;
< Packet Downlink Assignment > ::=
       { 0 | 1 < TFI_ASSIGNMENT : bit (5) >
              < RLC_MODE : bit >
              { 0 | 1 < ALPHA : bit (4) > }
              < GAMMA : bit (5) >
              < POLLING : bit >
              < TA_VALID : bit (1) > }
       { 0 | 1 < TIMING_ADVANCE_INDEX : bit (4) > }
       { 0 | 1 < TBF_STARTING_TIME : bit (16) > }
       { 0 | 1 < P0 : bit (4) >
              < PR_MODE : bit (1) > }
       { 0 | 1 -- indicates EGPRS TBF mode, see 44,060
       < EGPRS Window Size : < EGPRS Window Size IE >>
       < LINK_QUALITY_MEASUREMENT_MODE : bit (2) >
       { 0 | 1 < BEP_PERIOD2 : bit (4) > } }
       { 0 | 1 < PFI : bit (7) > }
       { 0 | 1 < NPM Transfer Time : bit (5) > }
       { 0    - A downlink BTTI TBF is assigned
              { 0           -- FANR is not activated for the assigned TBF
                     | 1    -- FANR is activated for the assigned TBF
                            < EVENT_BASED_FANR: bit (1) > }
              | 1    -- A downlink RTTI TBF is assigned
                     < EVENT_BASED_FANR: bit (1) >
                     < PDCH PAIR INDICATION: bit(3) > }
       < Downlink EGPRS Level: < EGPRS Level IE > > ;
```

ATI Example 1

In this example a one phase access assignment is considered where all MS $104_1$, $104_2$, $104_3$, $104_4$ ... $104_n$ are assigned uplink TBF 128 resources using the Packet Uplink Assignment IE of TABLE 7 above:
  MS Specific TBF Parameters=1+Packet Uplink Assignment (2)+One Phase Access (1)+TFI_ASSIGNMENT (5)+POLLING (1)+USF (3)+USF_GRANULARITY (1)+{1+P0 (4)+PR_MODE (1)}+CHANNEL_CODING_COMMAND (2)+TLLI_BLOCK_CHANNEL_CODING (1)+{1+ALPHA (4)}+GAMMA (5)+{1+TIMING_ADVANCE_INDEX (4)}+{1+TBF_STARTING_TIME (0)}+{1+PFI(7)}=47 bits
  ATI message 138 instance 1 addresses 3 MS as per FIG. 4C=Page Mode (2)+Message Reference ID (2)+MS Assignment Bitmap (8)+3*(MS Specific TBF Parameters)=12+3*(47)=153 bits=1 PACCH block.
  ATI message 138 instance 2 addresses 2 MS as per FIG. 4C=Page Mode (2)+Message Reference ID (2)+MS Assignment Bitmap (8)+2*(MS Specific TBF Parameters)=12+2*(47)=106 bits=1 PACCH block.

ATI Example 2

In this example a two phase access assignment is considered where all MS $104_1$, $104_2$, $104_3$, $104_4$ ... $104_n$ are assigned uplink TBF 128 resources using the Packet Uplink Assignment IE of TABLE 7 above:
  MS Specific TBF Parameters=1+Packet Uplink Assignment (2)+Two Phase Access (1)+{1+ALPHA (4)}+GAMMA (5)+TBF_STARTING_TIME (16)+{1+P0 (4)+PR_MODE(1)}+{1+PFI(7)}=44 bits
  ATI message 138 instance 1 addresses 3 MS as per FIG. 4C=Page Mode (2)+Message Reference ID (2)+MS Assignment Bitmap (8)+3*(MS Specific TBF Parameters)=12+3*(44)=144 bits=1 PACCH block.
  ATI message 138 instance 2 addresses 2 MS as per FIG. 4C=Page Mode (2)+Message Reference ID (2)+MS Assignment Bitmap (8)+2*(MS Specific TBF Parameters)=12+2*(44)=100 bits=1 PACCH block.

ATI Example 3

In this example a two phase access assignment is considered where all MS $104_1$, $104_2$, $104_3$, $104_4$ ... $104_n$ are assigned uplink TBF 128 resources using the EGPRS Packet Uplink Assignment IE of TABLE 7 above:
  MS Specific TBF Parameters=1+EGPRS Packet Uplink Assignment (2)+{1+Access Technologies Request (0)}+Two Phase Access (1)+{1+ALPHA (4)}+GAMMA (5)+TBF_STARTING_TIME (16)+NUMBER OF RADIO BLOCKS ALLOCATED (2)+{1+P0 (4)+PR_MODE (1)}+{1+PFI(7)}=47 bits
  ATI message 138 instance 1 addresses 3 MS as per FIG. 4C=Page Mode (2)+Message Reference ID (2)+MS Assignment Bitmap (8)+3*(MS Specific TBF Parameters)=12+3*(47)=153 bits=1 PACCH block.
  ATI message 138 instance 2 addresses 2 MS as per FIG. 4C=Page Mode (2)+Message Reference ID (2)+MS Assignment Bitmap (8)+2*(MS Specific TBF Parameters)=12+2*(47)=106 bits=1 PACCH block.

7. Downlink TBF Establishment Using OSAP Messages

Here we consider the case where a MS $104_1$, $104_2$, $104_3$, $104_4$ ... $104_n$ in Idle mode can be assigned a downlink TBF without first performing the paging procedure (i.e. the legacy READY timer is running and the network knows the MS location at the cell level). According to legacy operation, downlink TBF establishment is performed by sending an Immediate Assignment message that includes a Packet Downlink TBF Assignment on its paging group (if in DRX mode) or on any AGCH occurrence (if in non-DRX mode immediately following TBF release).

When considering an OSAP capable MS $104_1$, $104_2$, $104_3$, $104_4$ ... $104_n$ the network has the option of using the EIA 132 and ATI 138 messages defined for OSAP to allocate such a MS packet resources for a downlink TBF as follows:
  The network must assign the OSAP capable MS $104_1$, $104_2$, $104_3$, $104_4$ ... $104_n$ an alternate identity (called a Temporary OSAP Identity) on a per cell basis that remains valid while the corresponding ready timer $304_1$, $304_2$, $304_3$, $304_4$ ... $304_n$ is running in the BSS 102. This requires a BSS 102 to have knowledge of the length of the ready timer $304_1$, $304_2$, $304_3$, $304_4$ ... $304_n$ which can be realized in a number of ways (e.g. through the support of PFCs).
  The BSS 102 can use PACCH 140 signaling to assign a MS $104_1$, $104_2$, $104_3$, $104_4$ ... $104_n$ a Temporary OSAP Identity (TOI) at any time while a TBF is ongoing for an OSAP capable MS $104_1$, $104_2$, $104_3$, $104_4$ ... $104_n$.
  Once a MS $104_1$, $104_2$, $104_3$, $104_4$ ... $104_n$ has been assigned a TOI then as long as it remains valid it can be included in an EIA message 132 that includes DL TBF related information for that MS (see the Temporary OSAP Identity field in TABLE 6).
  Since the use of FN Information+Random Bits (for UL TBF 128 establishment) or Temporary OSAP Identity (for DL TBF establishment) is indicated per instance of MS $104_1$, $104_2$, $104_3$, $104_4$ ... $104_n$ addressed by an EIA message 132, any given instance of an EIA message can support any combination of MSs $104_1$, $104_2$, $104_3$, $104_4$ ... $104_n$ for which either UL or DL TBF establishment is needed (see FIG. 4D—which shows 5 MSs).
  The Temporary OSAP Identity can be from 9 to 12 bits in length allowing for up to a maximum of 4096 such identities to be maintained per cell.
  It should be noted that this mechanism for DL TBF establishment reduces the overall DL CCCH load, thus providing additional CCCH capacity for non-OSAP mobile stations.
  The net benefit of having the OSAP messages also allow for DL TBF establishment is of course that a single EIA message 132 sent on the AGCH 106 can address up to 8 MS $104_1$, $104_2$, $104_3$, $104_4$ ... $104_n$ for which DL TBF establishment is needed. An OSAP capable MS $104_1$, $104_2$, $104_3$, $104_4$ ... $104_n$ that has been assigned a Temporary OSAP Identity will acquire SRP information 134/indicator 302 from SI 120, receive an EIA message 132 and a supplemental ATI message 138 instance to establish a DL TBF following the same steps used for UL TBF 128 establishment except that it is addressed using the Temporary OSAP Identity in the EIA message 132 (i.e. it cannot be addressed using FN Information+Random Bits since the RACH 126 is not used during DL TBF establishment for a MS $104_1$, $104_2$, $104_3$, $104_4$ ... $104_n$ having a Temporary OSAP Identity in Idle mode).

8. Conclusion

A mechanism for enhancing AGCH 106 capacity has been described based on introducing an optimized system access procedure (OSAP) whereby the amount of MS specific information within an assignment message 132 sent on the AGCH 106 can be minimized by using new BCCH information and PACCH 140 signaling to provide supplemental MS specific information. As indicated by the examples provided in section 5 above, a significant AGCH 106 capacity gain is possible when using OSAP (e.g. 8 mobile stations $104_1$, $104_2$, $104_3$, $104_4$ ... $104_n$ can be addressed by a single assignment message 132 sent on the AGCH 106). The OSAP related signaling used for UL TBF 128 establishment can also be used for DL TBF establishment for a MS $104_1$, $104_2$, $104_3$, $104_4$ ... $104_n$ whose location is known at the cell level. Thereby the same AGCH 106 capacity gain can be achieved for any combination of UL and DL TBF establishment. Considering that the AGCH 106 capacity is seen as becoming increasingly problematic if the load offered by devices supporting delay tolerant applications increases significantly over the next few years, the introduction of OSAP as a new GERAN Rel-12 feature as described herein is seen as being beneficial towards minimizing the potential for the AGCH 106 to become a bottleneck.

REFERENCES

[1] GP-111202—Continued discussion for IPA parameters—Huawei Technologies Co., Ltd.
[2] GP-111065—Usage of Higher MCSs on CCCH Downlink—Telefon AB LM Ericsson, ST-Ericsson SA
[3] GP-111708—Improved AGCH Capacity using Static Radio Parameters—Telefon AB LM Ericsson, ST-Ericsson SA
[4] GP-111709—Calculating the Probability of Access Collision—Telefon AB LM Ericsson, ST-Ericsson SA
[5] GP-111085—Analysis on Traffic Characteristic of IM Service in China—CMCC The references can be found at www.3GPP.org.

The following detailed discussion describes various features and advantages associated with the present invention. In particular, the following detailed discussion is based on an article prepared by the inventors which is entitled "Detailed OSAP Signalling Procedure" 3GPP TSG-GERAN #54, GP-120624 and was presented by the inventors in Sanya, China, May 14-18, 2012.

Detailed OSAP Signalling Procedures

1. Introduction

The OSAP feature described in a companion discussion paper (the aforementioned GP-120623) involves the introduction of new signaling procedures for more efficiently establishing both uplink and downlink TBFs. The detailed signaling procedures associated with the OSAP feature used for establishing uplink and downlink TBFs are examined in greater detail herein where it can be seen that this signalling essentially consists of a combination of new signaling combined with legacy signaling as follows:

New BCCH information 120 that indicates the OSAP feature is supported by the network and which provides information about the packet data resources that can be assigned using OSAP based signaling.

A new RACH message 124 that allows a BSS 102 to uniquely determine that a MS $104_1$, $104_2$, $104_3$, $104_4$ ... $104_n$ is requesting OSAP based signaling for uplink TBF 128 establishment.

New AGCH and PACCH signaling 132 and 138 supporting the establishment of uplink and downlink TBFs used for uplink and downlink user data transmission (e.g. 130$a$ and 130$b$ for the case of uplink data transmission).

The legacy one phase and two phase contention resolution procedure for uplink TBF 128 establishment.

Legacy TBF management and release procedures for uplink and downlink TBFs established using OSAP based signaling.

2. OSAP—Detailed Operation for UL TBF 128 Establishment

A serving cell that supports OSAP based signaling is managed by a corresponding BSS 102 that is capable of receiving a new 11-bit RACH message 124 consisting of an access burst that involves the use of a new training sequence code (TSC). Upon reading all OSAP related system information, an OSAP capable MS $104_1$, $104_2$, $104_3$, $104_4$ ... $104_n$ will use this new TSC along with the signaling procedures shown in FIG. 5A (OSAP Signalling Procedures for UL TBF Establishment-Part 1) and FIG. 5B (OSAP Signalling Procedures for UL TBF Establishment-Part 2) below whenever it has uplink payload to send for the PS domain.

Figure 5A:
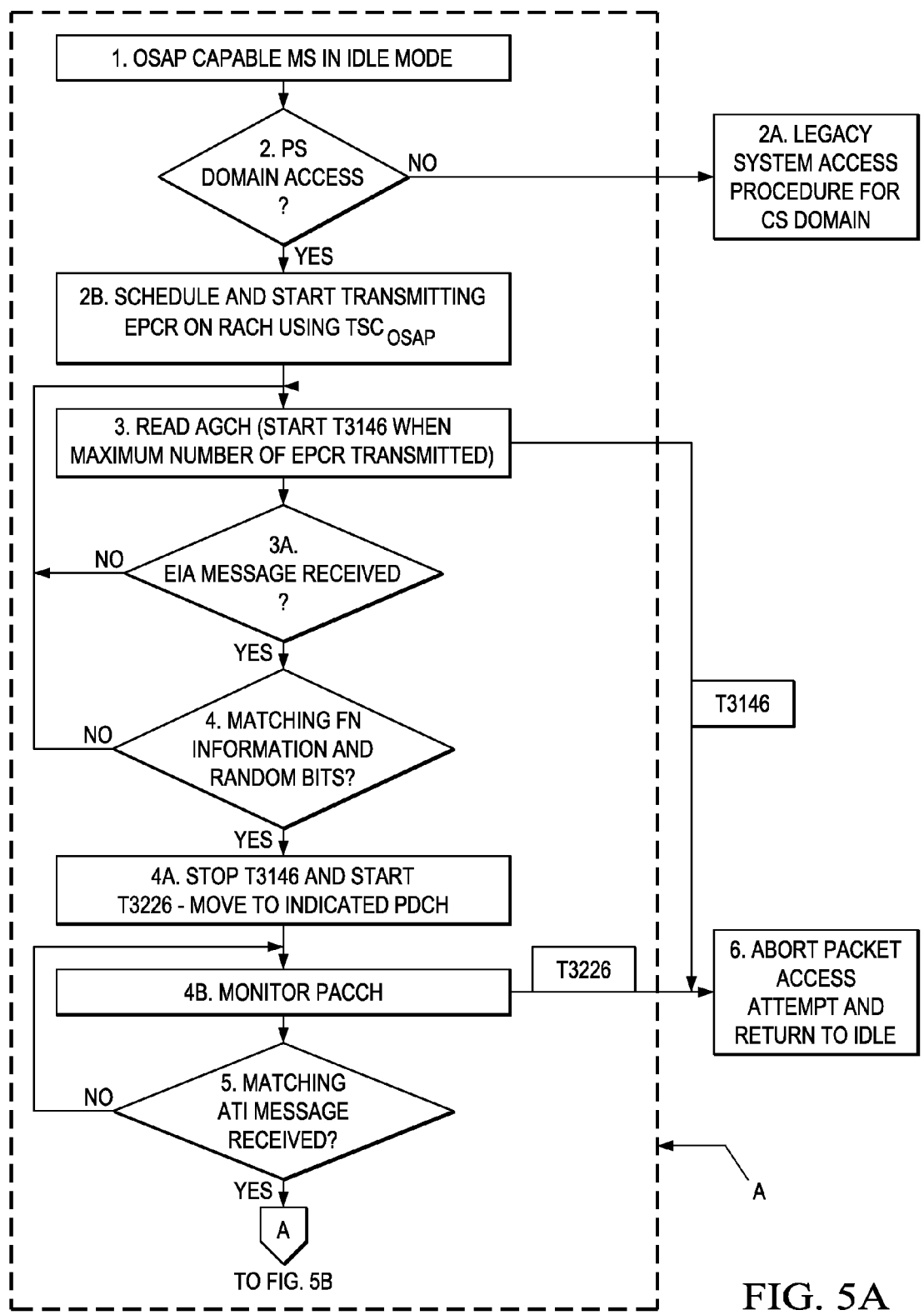
FIGS. 5A-5C are several diagrams associated with an article entitled "Detailed OSAP Signalling Procedure" 3GPP TSG-GERAN #54, GP-120624 presented by the inventors in Sanya, China, May 14-18, 2012 which are used to further help explain the wireless signaling that occurs between the BSS and multiple MSs to improve the capacity of the AGCH in accordance with various embodiments of the present invention.
Figure 5B:
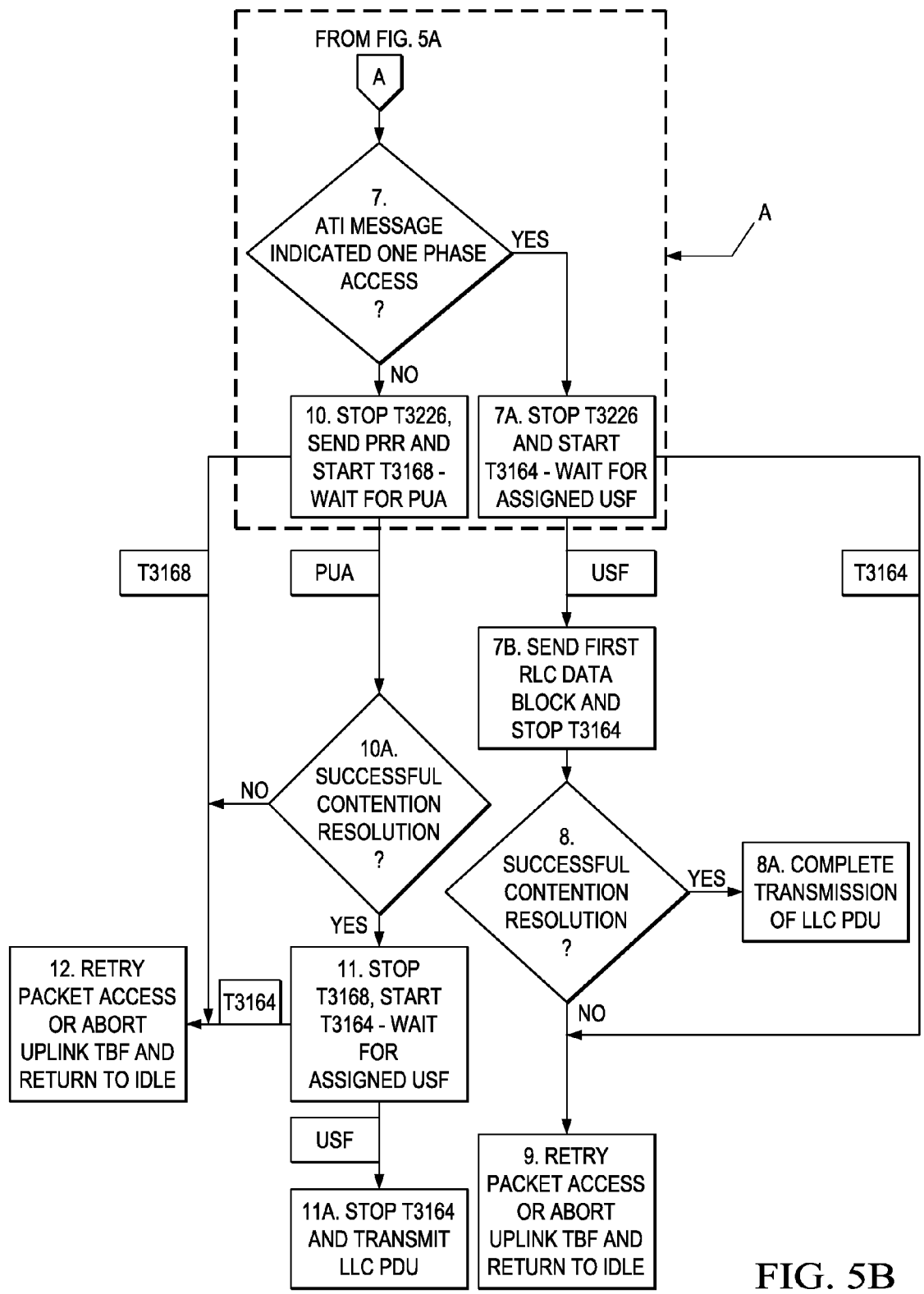
Figure 5C:
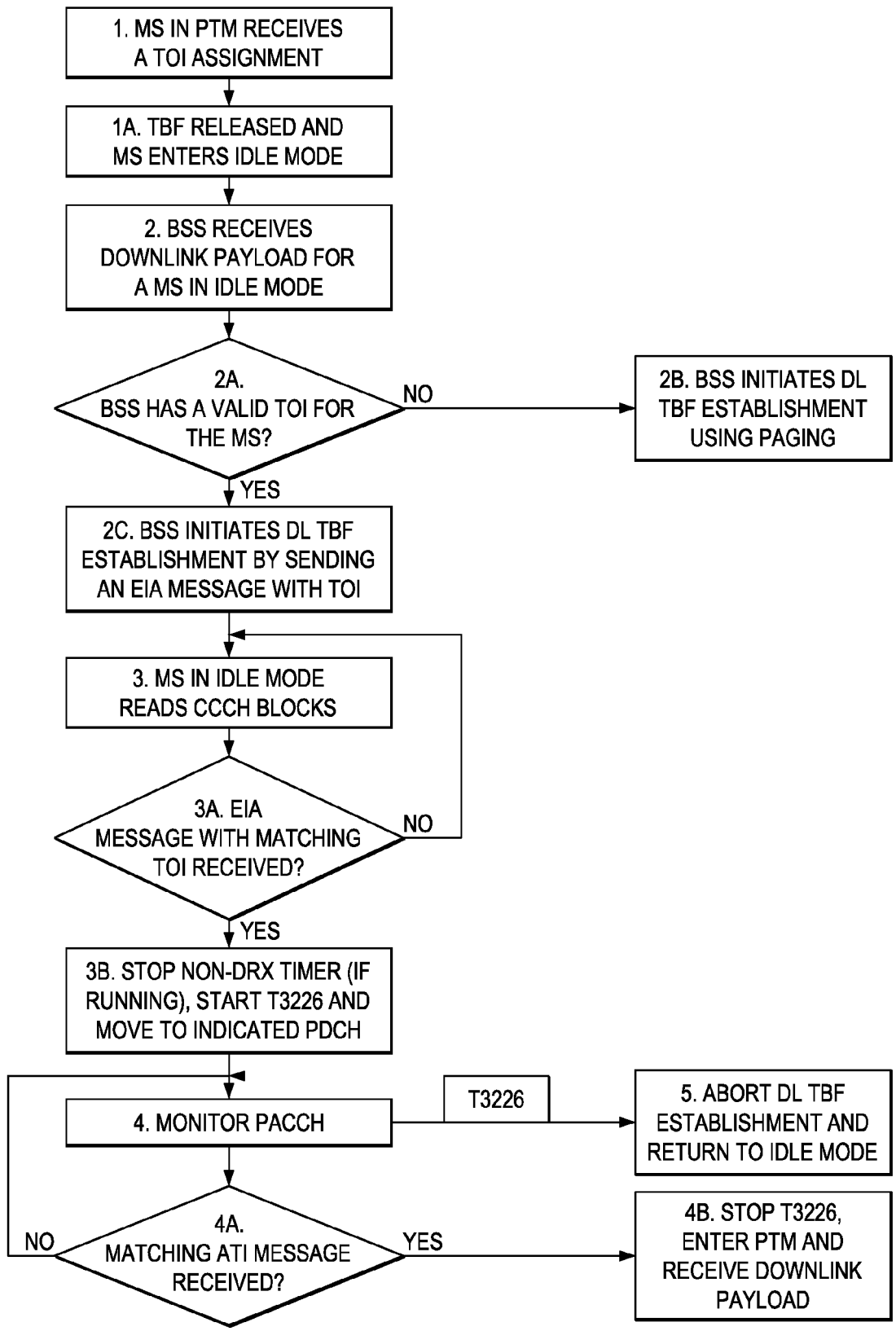

The structures within the box labeled with the numeral "A" in FIGS. 5A-5B indicate the use of new procedures and timers whereas the remaining structures indicate the use of legacy procedure and timers.

The OSAP based signalling described below allows for both one phase and two phase system access procedures and corresponding contention resolution as per legacy operation.

The code points supported by the new 11-bit RACH message 124 allow for indicating the same basic types of access requests as can be requested using legacy RACH messages (i.e. "one phase access", "two phase access", "signaling" and "single block packet access").

OSAP based signaling described below allows a BSS 102 to respond to a new RACH burst 124 by directing a MS $104_1$, $104_2$, $104_3$, $104_4$ ... $104_n$ to use either a one phase or two phase system access according to the flexibility supported by legacy operation.

1) An OSAP capable MS $104_1$, $104_2$, $104_3$, $104_4$ ... $104_n$ reads OSAP specific system information 120 once every 30 seconds as per the legacy SI refresh rate and then enters Idle mode.

2) All PS domain access attempts triggered by a MS $104_1$, $104_2$, $104_3$, $104_4$ ... $104_n$ capable of OSAP are subject to using OSAP procedures whereas all CS domain access attempts triggered by such a MS $104_1$, $104_2$, $104_3$, $104_4$ ... $104_n$ will be managed using legacy CS domain related procedures. An OSAP capable MS $104_1$, $104_2$, $104_3$, $104_4$ ... $104_n$ attempting a PS domain access therefore schedules and starts sending new RACH bursts referred to as Enhanced Packet Channel Request (EPCR) messages 124 which support 11 bits of payload space and a training sequence code (TSC) that allows a BSS 102 to uniquely detect reception of an EPCR message 124.

The code points supported by the EPCR message 124 allow for a MS $104_1$, $104_2$, $104_3$, $104_4$ ... $104_n$ to indicate "one phase access", "two phase access", "signaling" and "single block packet access" as per PS domain related code points supported by the legacy EGPRS Packet Channel Request message (see TABLE 8).

3) After starting the access procedure by transmitting an EPCR message 124 the MS $104_1$, $104_2$, $104_3$, $104_4$ ... $104_n$ starts looking for an Enhanced Immediate Assignment (EIA) message 132 with matching "FN Information" and "Random Bits". T3146 (legacy) is only started after the maximum number of EPCR messages 124 have been transmitted.

4) Upon receiving an Enhanced Immediate Assignment (EIA) message 132 with matching "FN Information" and "Random Bits" (carried within the MS Specific EIA Parameters IE) the MS $104_1$, $104_2$, $104_3$, $104_4$ ... $104_n$ stops T3146 (if running), starts T3226 (new), moves to the indicated PDCH resources and monitors the downlink PACCH 140 for a matching Additional TBF Information (ATI) message 138. Note that this means a BSS 102 must respond to an EPCR message 124 by sending an EIA message 132 since a MS 104₁, 104₂, 104₃, 104₄ ... 104ₙ performing an OSAP based system access will only consider EIA messages 132 as potentially containing a matching response.

5) Upon receiving an ATI message 138 instance the MS 104₁, 104₂, 104₃, 104₄ ... 104ₙ reads the "MS Assignment Bitmap" therein to determine if it is addressed by that ATI message instance. In other words, if it considered the Nth instance of information carried within the MS Specific EIA Parameters IE of the EIA message 132 to contain matching information then it checks to see if the Nth bit of this bitmap is set to "1". If the Nth bit is set to "1" then the MS 104₁, 104₂, 104₃, 104₄ ... 104ₙ concludes that the corresponding instance of the MS Specific TBF Parameters IE in the received ATI message 138 provides it with all remaining information 134' and 136' needed for uplink TBF 128 establishment including whether or not it is to proceed using the one phase access or the two phase access procedure (see FIG. 4B).

A small Message Reference ID field (2 bits long) is present within both the EIA message 132 and ATI message 138 so that a MS 104₁, 104₂, 104₃, 104₄ ... 104ₙ can precisely associate a received ATI message 138 instance to the specific EIA message 132 that has the same Message ID value:

- Note that the EIA message 132 will not include any TFI information (as it will instead be included in the ATI message 138) and as such a MS 104₁, 104₂, 104₃, 104₄ ... 104ₙ assumes that if it received a match in the Nth instance of the MS specific information in an EIA message 132 then it is to use the Nth instance of the MS specific information in the ATI message 138 corresponding to that EIA message 132.
- Since an ATI message 138 instance may potentially be missed by a mobile station 104₁, 104₂, 104₃, 104₄ ... 104ₙ (i.e. even though it is sent using CS-1 coding) a BSS 102 may choose to make limited pre-emptive re-transmissions of these messages.
- During times of heavy system access load a BSS 102 may need to send different sets of one or more ATI message 138 instances (i.e. each set of one or more ATI message 138 instances is unique in that it addresses the specific group of mobile stations 104₁, 104₂, 104₃, 104₄ ... 104ₙ addressed by its corresponding EIA message 132) in relatively quick succession on the PACCH 140 of a specific packet resource while also making use of pre-emptive ATI message re-transmissions.
- As such, to avoid the potential for a MS 104₁, 104₂, 104₃, 104₄ ... 104ₙ to incorrectly associate an ATI message 138 instance with a previously received EIA message 132 (and thereby apply incorrect additional TBF information), the introduction of a two bit Message Reference ID field in both the EIA and ATI messages 132 and 138 is seen as being sufficient.

6) If T3146 expires prior to receiving a matching EIA message 132 or T3226 expires before receiving a matching ATI message 138 then the MS 104₁, 104₂, 104₃, 104₄ ... 104ₙ aborts the packet access attempt and returns to Idle mode.

7) If the ATI message 138 indicates a one phase access is to be used the MS 104₁, 104₂, 104₃, 104₄ ... 104ₙ stops T3226, starts T3164 and waits for the first instance of its assigned USF. Upon receiving the first instance of its assigned USF, the MS 104₁, 104₂, 104₃, 104₄ ... 104ₙ stops T3164, sends its first RLC data block and proceeds with one phase access contention resolution according to legacy procedures. Note that even if a MS 104₁, 104₂, 104₃, 104₄ ... 104ₙ indicates a one phase within an EPCR message 124 (see TABLE 8) the BSS 102 can still send an ATI message 138 that forces the MS 104₁, 104₂, 104₃, 104₄ ... 104ₙ to perform a two phase access (see step 10 below).

8) If contention resolution is successful the MS 104₁, 104₂, 104₃, 104₄ ... 104ₙ completes the transmission of its user data (LLC PDU) according to legacy operation. After completing the transmission of its user data the uplink TBF 128 is released according to legacy procedures.

9) If T3164 expires before the MS 104₁, 104₂, 104₃, 104₄ ... 104ₙ receives the first instance of its assigned USF or it experiences unsuccessful one phase contention resolution it may either retry the packet access or abort the uplink TBF 128 as per legacy procedures.

10) If the ATI message 138 indicates a two phase access is to be used then the MS 104₁, 104₂, 104₃, 104₄ ... 104ₙ stops T3226, sends a PRR, starts T3168 and waits for a PUA in response to the PRR. Upon receiving the PUA the MS 104₁, 104₂, 104₃, 104₄ ... 104ₙ proceeds with two phase contention resolution according to legacy procedures.

Note that, similar to legacy operation, if the establishment cause in the EPCR message 124 indicates a request for a one phase packet access or signaling the network may send an ATI message 138 that grants either a one phase access or a two phase access. If a Multi Block allocation is granted by the ATI message 138 it forces the mobile station 104₁, 104₂, 104₃, 104₄ ... 104ₙ to perform a two phase access.

11) If contention resolution is successful the MS 104₁, 104₂, 104₃, 104₄ ... 104ₙ stops T3168, starts T3164 and waits for the first instance of its assigned USF. Upon receiving the first instance of its assigned USF then the MS 104₁, 104₂, 104₃, 104₄ ... 104ₙ stops T3164 and begins transmitting its user data (LLC PDU) according to legacy operation. After completing the transmission of its user data the TBF 128 is released according to legacy procedures.

12) If T3168 expires before the MS 104₁, 104₂, 104₃, 104₄ ... 104ₙ receives a PUA in response to the PRR or T3164 expires before the MS 104₁, 104₂, 104₃, 104₄ ... 104ₙ receives the first instance of its assigned USF or it experiences unsuccessful two phase contention resolution then the MS 104₁, 104₂, 104₃, 104₄ ... 104ₙ may either retry the packet access or abort the uplink TBF 128 as per legacy procedures.

TABLE 8

ENHANCED PACKET CHANNEL REQUEST message 124 content

| < Enhanced Packet channel request message content > ::= | | |
|---|---|---|
| < OSAP Request - one phase access : | 000 | < RandomBits : bit (8) > > |
| < OSAP Request - signalling : | 001 | < RandomBits : bit (8) > > |
| < OSAP Request - single block packet access : | 010 | < RandomBits : bit (8) > > |
| < OSAP Request - two phase access : | 011 | < RandomBits : bit (8) > >; |

2. OSAP—Detailed Operation for DL TBF Establishment

The scenario addressed is where an OSAP capable MS 104₁, 104₂, 104₃, 104₄ ... 104ₙ is in Idle mode and can be assigned a downlink TBF without first performing the paging procedure because its corresponding legacy READY timer is running and the network therefore knows the MS location at the cell level. In this case downlink TBF establishment is performed as shown in FIG. 4C (OSAP Signalling Procedures for DL TBF Establishment).

1) During an ongoing TBF the BSS 102 may at any time use PACCH 140 signaling assign a Temporary OSAP Identity (TOI) to an OSAP capable MS $104_1$, $104_2$, $104_3$, $104_4$ ... $104_n$. The assigned TOI remains valid for as long as the corresponding ready timer $304_1$, $304_2$, $304_3$, $304_4$ ... $304_n$ is running in the BSS 102 and therefore requires a BSS 102 to have knowledge of the length of the ready timer $304_1$, $304_2$, $304_3$, $304_4$ ... $304_n$ (e.g. this can be realized if PFC procedures are supported by the network).

2) Upon receiving downlink payload (i.e. LLC PDUs) for a MS $104_1$, $104_2$, $104_3$, $104_4$ ... $104_n$ in Idle mode having a valid TOI the BSS 102 initiates downlink TBF establishment by sending an EIA message 132 that includes the TOI of that MS (i.e. instead of FN Information+Random Bits):

If the non-DRX mode feature is not supported (i.e. at TBF release the MS $104_1$, $104_2$, $104_3$, $104_4$ ... $104_n$ immediately enters the DRX mode) the BSS 102 sends the EIA message 132 on the CCCH of the corresponding serving cell using any of the radio blocks defined by the paging group of that MS as defined in 3GPP TS 45.002 (the contents of which are incorporated herein by reference).

If the non-DRX mode feature is supported (i.e. at TBF release the MS $104_1$, $104_2$, $104_3$, $104_4$ ... $104_n$ immediately enters the non-DRX mode for a period of time determined by the non-DRX timer) and the BSS 102 determines that the MS $104_1$, $104_2$, $104_3$, $104_4$ ... $104_n$ is in the non-DRX mode it may send the EIA message 132 on the CCCH of the corresponding serving cell using any non-BCCH blocks. Otherwise, it sends the EIA message 132 on the CCCH of the corresponding serving cell using any of the radio blocks defined by the paging group of that MS).

3) Upon receiving an Enhanced Immediate Assignment (EIA) message 132 with matching TOI (carried within the MS Specific EIA Parameters IE) the MS $104_1$, $104_2$, $104_3$, $104_4$ ... $104_n$ stops the non-DRX timer (if running), starts T3226 (new), moves to the indicated PDCH resources and monitors the downlink PACCH 140 for a matching Additional TBF Information (ATI) message 138.

4) Upon receiving an ATI message 138 instance the MS $104_1$, $104_2$, $104_3$, $104_4$ ... $104_n$ reads the "MS Assignment Bitmap" therein to determine if it is addressed by that ATI message instance. In other words, if it considered the Nth instance of information carried within the MS Specific EIA Parameters IE of the EIA message 132 to contain matching information then it checks to see if the Nth bit of this bitmap is set to "1". If the Nth bit is set to "1" then the MS $104_1$, $104_2$, $104_3$, $104_4$ ... $104_n$ concludes that the corresponding instance of the MS Specific TBF Parameters IE in the received ATI message 138 provides it with all remaining information needed for downlink TBF establishment.

5) If T3226 expires before receiving a matching ATI message 138 then the MS $104_1$, $104_2$, $104_3$, $104_4$ ... $104_n$ aborts the downlink TBF establishment attempt and returns to Idle mode.

4. Conclusion

The detailed operation of the OSAP procedure as described above effectively involves the distribution of uplink TBF 128 specific information over the BCCH 122, AGCH 106 and PACCH 140 (as compared to just the AGCH for legacy operation). This allows the MS specific portion of this distributed information sent on the AGCH 106 to be significantly reduced compared to legacy operation and an AGCH gain is thereby realized in that the number of MS $104_1$, $104_2$, $104_3$, $104_4$ ... $104_n$ addressed per OSAP specific AGCH assignment message 132 can be significantly increased compared to legacy AGCH assignment messages. Considering that AGCH 106 capacity is seen as becoming increasingly more problematic as system access load increases (e.g. due to the increased traffic load by MTC as well as increased use of instant messaging type applications) the introduction of OSAP as a new GERAN Rel-12 feature as described herein is seen as providing an essential AGCH capacity improvement.

The following discussion describes the various advantages that the OSAP procedure of the present invention has over the IPA procedure that has been presented by Huawei Technologies Co., Ltd. The first detailed discussion is based on an article prepared by the inventors which is entitled "IPA Analysis for Uplink Assignments" 3GPP TSG-GERAN #55, GP-120979 and was presented in Vienna, Austria, Aug. 27-31, 2012. And, the second detailed discussion is based on an article prepared by the inventors which is entitled "IPA Analysis for Downlink Assignments" 3GPP TSG-GERAN #55, GP-120980 and was presented in Vienna, Austria, Aug. 27-31, 2012.

IPA Analysis for Uplink Assignments (see GP-120979)

1. Introduction

The IPA feature was included in the Rel-11 GERAN specifications in light of operator networks that experience a high CCCH load and thus have typically made use of Multiple CCCH (MCCCH) as a means for dealing with this load. However, when considering IPA as an alternative mechanism for alleviating high CCCH load for the case of uplink TBF establishment, additional consideration must be given to network scenarios with high load where the use of one phase system access is prioritized.

It is shown in this paper that for the case of one phase access IPA will at best be able to support the assignment of two uplink TBFs, because IPA must provide more MS specific information than it does for the case of a two phase access. As such, the IPA capabilities as indicated by reference [1] have been further considered resulting in the following findings:

For the one phase access case, a maximum of two MS can be addressed within an IPA message regardless if hopping is used or not (as opposed to 3 MS being addressable for the non-hopping case as suggested by reference [1]).

For the one or two phase access cases where the Direct Encoding option is used there is no gain as only one MS can be addressed within an IPA message (this is not discussed in reference [1]).

2. IPA Message Space Analysis

Considering the 19 octet payload space limitation of the "IPA Rest Octets IE" (see Annex A.1 below) and analyzing the proposed content for this IE for the case of uplink TBF assignments where the BCCH carrier is not used, the following should be noted:

2.1 One Phase Access

A best case scenario for IPA message space utilization for the one phase access case (the IPA Uplink Assignment struct is used) when no frequency hopping is used in which case the Frequency Parameters struct provides information on a ARFCN (see highlighted text in Annex A.2 below). When uplink TBF resources are assigned for this best case scenario we get the following bit space utilization:

Total bits=1+[N*(1+43)+1]+3+1+(3+2+10)+1+1 where
N=the number of MS addressed by the IPA message→maximum value for N=2 (total bits=1+[2*44+1]+4+15+2=111 bits).

This means only 41 bits of payload space will remain according to the 152 bit limit which is not enough to support uplink resource assignments for a 3rd mobile station.

A worst case scenario for IPA message space utilization for the one phase access case when frequency hopping is used in which case the Frequency Parameters struct can be provided using Direct encoding 2 information (see magenta shaded text in Annex A.2 below). When uplink TBF resources are assigned for this worst case scenario we get the following bit space utilization:

Total bits=1+[N*(1+43)+1]+3+1+(3+2+6+6+4+64)+1+1 where N=the number of MS addressed by the IPA message→maximum value for N=1 (total bits=1+[1*44+1]+4+85+2=137 bits).

This means only 15 bits of payload space will remain according to the 152 bit limit which is not enough to support uplink resource assignments for a 2nd mobile station.

2.2 Two Phase Access

A best case scenario for IPA message space utilization for the two phase access case (the IPA Single Block Uplink Assignment struct is used) is where the Frequency Parameters struct provides ARFCN information (see highlighted text in Annex A.2 below). When uplink TBF resources are assigned for this best case scenario we get the following bit space utilization:

Total bits=1+1+[N*(1+36)+1]+3+1+(3+2+10) where N=the number of MS addressed by the IPA message→maximum value for N=3 (total bits=2+[3*37+1]+4+15=133 bits).

This means only 19 bits of payload space will remain according to the 152 bit limit which is not enough to support uplink resource assignments for a 4th mobile station.

A worst case scenario for IPA message space utilization for the two phase access case is where the Frequency Parameters struct provides the Direct encoding 2 information (see bold text in Annex A.2 below). When uplink TBF resources are assigned for this worst case scenario we get the following bit space utilization:

Total bits=1+1+[N*(1+36)+1]+3+1+(3+2+6+6+4+64) where N=the number of MS addressed by the IPA message→maximum value for N=1 (total bits=2+[1*37+1]+4+85=129 bits).

This means only 23 bits of payload space will remain according to the 152 bit limit which is not enough to support uplink resource assignments for a 2nd mobile station.

2.3 Baseband Frequency Hopping Used

A common deployment scenario is where baseband frequency hopping is used and the BCCH frequency is within the hopping set in which case the Frequency Parameters IE needs to be included since MAIO and HSN type information will be needed by a mobile station. For this scenario, when the Frequency Parameters IE provides this information using either the Direct Encoding 1 or Direct Encoding 2 option the worst case scenarios identified in 2.1 and 2.2 above will apply. However, when the Frequency Parameters IE provides this information using the Indirect Encoding option the best case scenarios identified in 2.1 and 2.2 above will apply.

2.4 Baseband Frequency Hopping not Used

Another deployment scenario may be that where baseband hopping is not used and the BCCH carrier is not preferred for PS resource allocations (e.g. due to the reduced efficiency of PDCH resource utilization resulting from non-contiguous PDCHs when MCCCH is used on the BCCH carrier or when SDCCHs are allocated on the BCCH carrier). This will require ARFCN information to be provided by the Frequency Parameters IE which corresponds to the best case scenarios identified in 2.1 and 2.2 above.

2.5 Implicit Reject Information

Though not currently specified, the "IPA Rest Octets IE" needs to include a bit for indicating "Implicit Reject CS" and a bit for indicating "Implicit Reject PS" since the IPA message can be sent on the AGCH and should therefore be able to convey implicit reject information for IPA capable mobile stations. Adding these 2 bits will make the IPA Rest Octets bit shortage problem even worse.

3. Conclusion

When considering the case of system operation where IPA is used as an alternative mechanism for alleviating high CCCH load, even if the best case scenario of IPA message space utilization is considered, IPA will only be able to support the assignment of uplink TBFs for a maximum of 2 mobile stations when the use of one phase access is prioritized. As such, the use of the IPA feature may in practice only provide a very limited improvement in AGCH signalling capacity regarding uplink TBF assignments which may not be sufficient for longer term AGCH loading scenarios.

REFERENCES

[1] GP-110616, "Further discussion on IPA message", source Huawei Technologies Co. Ltd, Qualcomm Incorporated. GERAN#50.

The reference can be found at www.3GPP.org.

Annex A.1

9.1.18a Immediate Packet Assignment

This message is sent on the CCCH by the network to multiple mobile stations in idle mode to assign either an uplink or a downlink packet data channel configuration in the cell. See table 9.

The L2 pseudo length of this message is the sum of lengths of all information elements present in the message except the IPA Rest Octets and L2 Pseudo Length information elements.

NOTE: The network should take into account limitations of certain mobile stations to understand IMMEDIATE PACKET ASSIGNMENT message as these mobile stations may not be able to decode the Page Mode information element.

Message type: IMMEDIATE PACKET ASSIGNMENT
Significance: dual
Direction: network to mobile station

TABLE 9

IMMEDIATE PACKET ASSIGNMENT message content

| IEI | Information element | Type/Reference | Presence | Format | length |
|-----|---------------------|----------------|----------|--------|--------|
|     | L2 Pseudo Length    | L2 Pseudo Length 10.5.2.19 | M | V | 1 |
|     | RR management Protocol Discriminator | Protocol Discriminator 10.2 | M | V | ½ |

TABLE 9-continued

IMMEDIATE PACKET ASSIGNMENT message content

| IEI | Information element | Type/Reference | Presence | Format | length |
|---|---|---|---|---|---|
| | Skip Indicator | Skip Indicator 10.3.1 | M | V | ½ |
| | Immediate Assignment Message Type | Message Type 10.4 | M | V | 1 |
| | Page Mode | Page Mode 10.5.2.26 | M | V | ½ |
| | Spare | Spare | M | V | ½ |

TABLE 9-continued

IMMEDIATE PACKET ASSIGNMENT message content

| IEI | Information element | Type/Reference | Presence | Format | length |
|---|---|---|---|---|---|
| | IPA Rest Octets | IPA Rest Octets 10.5.2.78 | M | V | 19 |

Annex A.2

10.5.2.78 IPA Rest Octets

The IPA Rest Octets information element contains spare bits and possibly at least one of the IPA Uplink Assignment struct, the IPA Downlink Assignment struct, and the IPA Single Block Uplink Assignment struct.

The IPA Rest Octets information element is coded according to the syntax specified below and described in table 10.

The IPA Rest Octets information element is a type 5 information element with 0-19 octets length.

TABLE 10

IPA Rest Octet information element

```
<IPA Rest Octets> ::=
        { 0 | 1   < IPA Uplink Assignment struct >}
        { 0 | 1   < IPA Downlink Assignment struct >}
        { 0 | 1   < IPA Single Block Uplink Assignment struct >}
        <spare padding>;
<IPA Uplink Assignment struct> ::=
        { 1       < Random Reference : bit (11) >
                  < FN_OFFSET: bit (8) >
                  < GAMMA : bit (5) >
                  < TIMING_ADVANCE_VALUE : bit (6) >
                  < TFI_ASSIGNMENT : bit (5) >
                  < USF: bit (3) >
                  < EGPRS_CHANNEL_CODING_COMMAND : bit (4) >
                  < Radio Access Capabilities Request: bit (1) >
        } ** 0;
                                        --Repeated as many times as necessary, once for each addressed
device
        < TN : bit (3) >
        { 0                             --'0' indicates that BCCH frequency shall be used
        | 1       {< Frequency Parameters: Frequency Parameters struct >}
        }
<IPA Single Block Uplink Assignment struct> ::=
        { 1       < Random Reference : bit (11) >
                  < FN_OFFSET: bit (8) >
                  < GAMMA : bit (5) >
                  < TIMING_ADVANCE_VALUE : bit (6) >
                  < STARTING_TIME_OFFSET: bit (6) >,
        } ** 0;                         --Repeated as many times as necessary, limited by the
space in the message
        < TN : bit (3) >
        { 0 ;                           --'0' indicates that BCCH frequency shall be used
        | 1 {< Frequency Parameters: Frequency Parameters struct >}
        }
< Frequency Parameters struct > ::=
        < TSC : bit (3) >
        {00<ARFCN:bit(10)>
        | 01 < Indirect encoding : < Indirect encoding struct > >
        | 10 < Direct encoding 1 : < Direct encoding 1 struct > >
        | 11 < Direct encoding 2 : < Direct encoding 2 struct > >} ;
< Indirect encoding struct > ::=
        < MAIO : bit (6) >
        < MA_NUMBER : bit (4) >
        { 0 | 1 < CHANGE_MARK_1 : bit (2) >
                  { 0 | 1 < CHANGE_MARK_2 : bit (2) >} } ;
< Direct encoding 1 struct > ::=
        < MAIO : bit (6) >
        < GPRS Mobile Allocation : < GPRS Mobile Allocation IE > > ;
< Direct encoding 2 struct > ::=
        < MAIO : bit (6) >
        < HSN : bit (6) >
        < Length of MA Frequency List contents : bit (4) >
        < MA Frequency List contents : octet (val(Length of MA Frequency List contents) + 3) > ;
< GPRS Mobile Allocation IE > ::=
        < HSN : bit (6) >
```

TABLE 10-continued

IPA Rest Octet information element

```
    { 0 | 1    < RFL number list : < RFL number list struct > > }
    { 0        < MA_LENGTH : bit (6) >
               < MA_BITMAP : bit (val(MA_LENGTH) + 1) >
    | 1        { 0 | 1 < ARFCN index list : < ARFCN index list struct > > } } ;
< RFL number list struct > ::=
    < RFL_NUMBER : bit (4) >
    { 0 | 1    < RFL number list struct > } ;
< ARFCN index list struct > ::=
    < ARFCN_INDEX : bit (6) >
    { 0 | 1    < ARFCN index list struct > } ;
```

IPA Analysis for Downlink Assignments (see GP-120980)

1. Introduction

The IPA feature was included in the Rel-11 GERAN specifications in light of operator networks that experience a high CCCH load and thus have typically made use of Multiple CCCH (MCCCH) as a means for dealing with this load. However, when considering IPA as an alternative mechanism for alleviating high CCCH load for the case of downlink TBF establishment, IPA will at best be able to support the assignment of to downlink TBFs for 2 mobile stations using the "IPA Downlink Assignment struct". As such, the IPA capabilities as indicated by reference [1] have been further considered resulting in the following findings:

When the Direct Encoding option is used for IPA there is no gain as only one MS can be addressed within an IPA message (this is not discussed by reference [1]).

2. IPA Message Space Analysis

Considering the 19 octet payload space limitation of the "IPA Rest Octets IE" (see Annex A.1 below) and analyzing the proposed content for this IE for the case of downlink TBF assignments where the BCCH carrier is not used, the following should be noted:

A best case scenario for IPA message space utilization is where the Frequency Parameters struct provides ARFCN information (see highlighted text in Annex A.2 below). When downlink TBF resources are assigned for this best case scenario we get the following bit space utilization:

Total bits=1+[N*(1+49)+1]+1+1+3+1+(3+2+10)+1 where N=the number of MS addressed by the IPA message→maximum value for N=2 (total bits=1+[2*50+1]+6+15+1=124 bits).

This means only 28 bits of payload space will remain according to the 152 bit limit which is not enough to support downlink resource assignments for a 3rd mobile station.

A worst case scenario for IPA message space utilization is where the Frequency Parameters struct provides the Direct encoding 2 information (see bold text in Annex A.2 below). When downlink TBF resources are assigned for this worst case scenario (64 bits of Mobile Allocation information provided) we get the following bit space utilization:

Total bits=1+[N*(1+49)+1]+1+1+3+1+(3+2+6+6+4+64)+1 where N=the number of MS addressed by the IPA message→maximum value for N=1 (total bits=1+[1*50+1]+6+85+1=144 bits).

This means only 8 bits of payload space will remain according to the 152 bit limit which is not enough to support downlink resource assignments for a 2nd mobile station.

It should also be noted that the Direct encoding 2 struct allows for more than 64 bits of Mobile Allocation information in which case an IPA message will not even be able to assign downlink TBF resources for even 1 mobile station.

A common deployment scenario is where baseband frequency hopping is used and the BCCH frequency is within the hopping set in which case the Frequency Parameters IE needs to be included since MAIO and HSN type information will be needed by a mobile station. For this scenario, when the Frequency Parameters IE provides this information using either the Direct Encoding 1 or Direct Encoding 2 option the worst case scenario above will apply. However, when the Frequency Parameters IE provides this information using the Indirect Encoding option the best case scenario above will apply.

Another deployment scenario may be that where baseband hopping is not used and the BCCH carrier is not preferred for PS resource allocations (e.g. due to the reduced efficiency of PDCH resource utilization resulting from non-contiguous PDCHs when MCCCH is used on the BCCH carrier or when SDCCHs are allocated on the BCCH carrier). This will require ARFCN information to be provided by the Frequency Parameters IE which corresponds to the best case scenario above.

Though not currently specified, the "IPA Rest Octets IE" needs to include a bit for indicating "Implicit Reject CS" and a bit for indicating "Implicit Reject PS" since the IPA message can be sent on the AGCH and should therefore be able to convey implicit reject information for IPA capable mobile stations. Adding these 2 bits will make the IPA Rest Octets bit shortage problem even worse.

3. Conclusion

When considering the case of system operation where IPA is used as an alternative mechanism for alleviating high CCCH load, even if the best case scenario of IPA message space utilization is considered IPA will only be able to support the assignment of downlink TBFs for a maximum of 2 mobile stations. As such, the use of the IPA feature may in practice only provide a very limited improvement in AGCH signalling capacity regarding uplink TBF assignments which may not be sufficient for longer term AGCH loading scenarios.

REFERENCE

[1] GP-110616, "Further discussion on IPA message", source Huawei Technologies Co. Ltd, Qualcomm Incorporated. GERAN#50.

The reference can be found at www.3GPP.org.

Annex A.1

9.1.18a Immediate Packet Assignment

This message is sent on the CCCH by the network to multiple mobile stations in idle mode to assign either an uplink or a downlink packet data channel configuration in the cell. See table 11.

The L2 pseudo length of this message is the sum of lengths of all information elements present in the message except the IPA Rest Octets and L2 Pseudo Length information elements.

NOTE: The network should take into account limitations of certain mobile stations to understand IMMEDIATE PACKET ASSIGNMENT message as these mobile stations may not be able to decode the Page Mode information element.

Message type: IMMEDIATE PACKET ASSIGNMENT
Significance: dual
Direction: network to mobile station

TABLE 11

IMMEDIATE PACKET ASSIGNMENT message content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol | Protocol Discriminator | M | V | ½ |

TABLE 11-continued

IMMEDIATE PACKET ASSIGNMENT message content

| IEI | Information element | Type/Reference | Presence | Format | length |
|---|---|---|---|---|---|
| | Discriminator | 10.2 | | | |
| | Skip Indicator | Skip Indicator 10.3.1 | M | V | ½ |
| | Immediate Assignment Message Type | Message Type 10.4 | M | V | 1 |
| | Page Mode | Page Mode 10.5.2.26 | M | V | ½ |
| | Spare | Spare | M | V | ½ |
| | IPA Rest Octets | IPA Rest Octets 10.5.2.78 | M | V | 19 |

Annex A.2

10.5.2.78 IPA Rest Octets

The IPA Rest Octets information element contains spare bits and possibly at least one of the IPA Uplink Assignment struct, the IPA Downlink Assignment struct, and the IPA Single Block Uplink Assignment struct.

The IPA Rest Octets information element is coded according to the syntax specified below and described in table 12.

The IPA Rest Octets information element is a type 5 information element with 0-19 octets length.

TABLE 12

IPA Rest Octet information element

```
<IPA Rest Octets> ::=
        { 0 | 1    < IPA Uplink Assignment struct >}
        { 0 | 1    < IPA Downlink Assignment struct >}
        { 0 | 1    < IPA Single Block Uplink Assignment struct >}
        <spare padding>;
< IPA Downlink Assignment struct> ::=
        { 1        < TLLI : bit (32) >
                   < TFI_ASSIGNMENT : bit (5) >
                   < GAMMA : bit (5) >
                   { 0 |1 < TIMING_ADVANCE_VALUE : bit (6) > }
        } ** 0;                         --Repeated as many times as necessary, limited by the
space in the message
        { 0 | 1    < LINK_QUALITY_MEASUREMENT_MODE: bit (2) > }
        < RLC_MODE : bit >
        < TN : bit (3) >
        { 0                             --'0' indicates that BCCH frequency shall be used
        | 1        {< Frequency Parameters: Frequency Parameters struct >}
        }
< Frequency Parameters struct > ::=
        < TSC : bit (3) >
        {00<ARFCN:bit(10)>
        | 01 < Indirect encoding : < Indirect encoding struct > >
        | 10 < Direct encoding 1 : < Direct encoding 1 struct > >
        | 11 < Direct encoding 2 : < Direct encoding 2 struct > > } ;
< Indirect encoding struct > ::=
        < MAIO : bit (6) >
        < MA_NUMBER : bit (4) >
        { 0 | 1    < CHANGE_MARK_1 : bit (2) >
                   { 0 | 1 < CHANGE_MARK_2 : bit (2) > } } ;
< Direct encoding 1 struct > ::=
        < MAIO : bit (6) >
        < GPRS Mobile Allocation : < GPRS Mobile Allocation IE > > ;
< Direct encoding 2 struct > ::=
        < MAIO : bit (6) >
        < HSN : bit (6) >
        < Length of MA Frequency List contents : bit (4) >
        < MA Frequency List contents : octet (val(Length of MA Frequency List contents) + 3) > ;
< GPRS Mobile Allocation IE > ::=
```

TABLE 12-continued

IPA Rest Octet information element

```
< HSN : bit (6) >
    { 0 | 1    < RFL number list : < RFL number list struct > > }
    { 0        < MA_LENGTH : bit (6) >
               < MA_BITMAP : bit (val(MA_LENGTH) + 1) >
    | 1        { 0 | 1 < ARFCN index list : < ARFCN index list struct > > } } ;
< RFL number list struct > ::=
    < RFL_NUMBER : bit (4) >
    { 0 | 1    < RFL number list struct > } ;
< ARFCN index list struct > ::=
    < ARFCN_INDEX : bit (6) >
    { 0 | 1    < ARFCN index list struct > } ;
```

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A base station subsystem (BSS) configured to interact with a plurality of mobile stations and perform a procedure to improve an Access Grant Channel (AGCH) capacity, the BSS comprising:
a processor; and
a memory that stores processor-executable instructions where the processor interfaces with the memory and executes the processor-executable instructions to enable the following operations:
assign a plurality of alternative identities to the plurality of mobile stations, wherein one of the alternative identities is assigned to one of the mobile stations, wherein each alternative identity is assigned on a per cell basis and is unique within a cell, and wherein for each alternative identity there is started a corresponding ready timer where each alternative identity remains valid while the corresponding ready timer is running;
send each one of the alternative identities to corresponding each one of the mobile stations; and
after the assign and send operations and when at least one of the plurality of mobile stations for which downlink Temporary Block Flow (TBF) establishment is needed is in an idle mode and the corresponding at least one ready timer is still running, send an immediate assignment message on the AGCH to the at least one of the plurality of mobile stations, wherein the immediate assignment message comprises (1) the at least one alternative identity for the at least one of the plurality of mobile stations, and (2) at least a portion of dynamic radio parameters which are to be used by the at least one of the plurality of mobile stations when establishing their respective downlink TBF.

2. The BSS of claim 1, wherein the processor further executes the processor-executable instructions to send each alternative identity to each mobile station by using Packet Associated Control Channel (PACCH) signaling while a TBF is ongoing for each mobile station.

3. The BSS of claim 1, wherein the processor further executes the processor-executable instructions to broadcast a new system information (SI) to the plurality of mobile stations, wherein the new SI includes static radio parameters which are to be used by the at least one of the plurality of mobile stations when establishing their respective downlink TBF.

4. The BSS of claim 1, wherein the immediate assignment message further includes static radio parameters which are to be used by the at least one of the plurality of mobile stations when establishing their respective downlink TBF.

5. The BSS of claim 1, wherein the processor further executes the processor-executable instructions to send a supplemental message after sending the immediate assignment message, wherein the supplemental message is sent on a Packet Associated Control Channel (PACCH) to the at least one of the plurality of mobile stations, and wherein the supplemental message comprises a remaining portion of the dynamic radio parameters which are to be used by the at least one of the plurality of mobile stations when establishing their respective downlink TBF.

6. The BSS of claim 1, wherein the processor further executes the processor-executable instructions to send a supplemental message after sending the immediate assignment message, wherein the supplemental message is sent on a Packet Associated Control Channel (PACCH) to the at least one of the plurality of mobile stations, wherein the supplemental message comprises (1) additional static radio parameters, and (2) a remaining portion of the dynamic radio parameters, and wherein the additional static radio parameters and the remaining portion of the dynamic radio parameters are to be used by the at least one of the plurality of mobile stations when establishing their respective downlink TBF.

7. The BSS of claim 1, wherein the processor further executes the processor-executable instructions to send a supplemental message after sending the immediate assignment message, wherein the supplemental message is sent on a Packet Associated Control Channel (PACCH) to the at least one of the plurality of mobile stations, wherein the supplemental message comprises additional static radio parameters, and wherein the additional static radio parameters are to be used by the at least one of the plurality of mobile stations when establishing their respective downlink TBF.

8. The BSS of claim 1, wherein the processor further executes the processor-executable instructions to send downlink payload data on the at least one of the established downlink TBFs to the at least one of the plurality of mobile stations.

9. A method implemented by a base station subsystem (BSS), which interacts with a plurality of mobile stations, for performing a procedure to improve an Access Grant Channel (AGCH) capacity, the method comprising the steps of:
assigning a plurality of alternative identities to the plurality of mobile stations, wherein one of the alternative identities is assigned to one of the mobile stations, wherein each alternative identity is assigned on a per cell basis and is unique within a cell, and wherein for each alternative identity there is started a corresponding ready timer where each alternative identity remains valid while the corresponding ready timer is running;

sending each one of the alternative identities to corresponding each one of the mobile stations;

after the assigning and sending steps and when at least one of the plurality of mobile stations for which downlink Temporary Block Flow (TBF) establishment is needed is in an idle mode and the corresponding at least one ready timer is still running, sending an immediate assignment message on the AGCH to the at least one of the plurality of mobile stations, wherein the immediate assignment message comprises (1) the at least one alternative identity for the at least one of the plurality of mobile stations, and (2) at least a portion of dynamic radio parameters which are to be used by the at least one of the plurality of mobile stations when establishing their respective downlink TBF.

10. The method of claim 9, wherein the sending step further comprises sending each alternative identity to each mobile station using Packet Associated Control Channel (PACCH) signaling while a TBF is ongoing for each mobile station.

11. The method of claim 9, further comprising a step of broadcasting a new system information (SI) to the plurality of mobile stations, wherein the new SI includes static radio parameters which are to be used by the at least one of the plurality of mobile stations when establishing their respective downlink TBF.

12. The method of claim 9, wherein the immediate assignment message further includes static radio parameters which are to be used by the at least one of the plurality of mobile stations when establishing their respective downlink TBF.

13. The method of claim 9, wherein after sending the immediate assignment message further comprising a step of sending a supplemental message on a Packet Associated Control Channel (PACCH) to the at least one of the plurality of mobile stations, and wherein the supplemental message comprises a remaining portion of the dynamic radio parameters which are to be used by the at least one of the plurality of mobile stations when establishing their respective downlink TBF.

14. The method of claim 9, wherein after sending the immediate assignment message further comprising a step of sending a supplemental message on a Packet Associated Control Channel (PACCH) to the at least one of the plurality of mobile stations, wherein the supplemental message comprises (1) additional static radio parameters, and (2) a remaining portion of the dynamic radio parameters, and wherein the additional static radio parameters and the remaining portion of the dynamic radio parameters are to be used by the at least one of the plurality of mobile stations when establishing their respective downlink TBF.

15. The method of claim 9, wherein after sending the immediate assignment message further comprising a step of sending a supplemental message on a Packet Associated Control Channel (PACCH) to the at least one of the plurality of mobile stations, wherein the supplemental message comprises additional static radio parameters, and wherein the additional static radio parameters are to be used by the at least one of the plurality of mobile stations when establishing their respective downlink TBF.

16. The method of claim 9, further comprising a step of sending downlink payload data on the at least one of the established downlink TBFs to the at least one of the plurality of mobile stations.

17. A mobile station configured to interact with a base station subsystem (BSS) and to improve an Access Grant Channel (AGCH) capacity, the mobile station comprising:

a processor; and a memory that stores processor-executable instructions where the processor interfaces with the memory and executes the processor-executable instructions to enable the following operations:

receive an alternative identity on Packet Associated Control Channel (PACCH) signaling from the BSS;

while in idle mode, receive an immediate assignment message on the AGCH sent from the BSS when a downlink Temporary Block Flow (TBF) needs to be established, wherein the immediate assignment message comprises (1) multiple alternative identities for multiple mobile stations including the alternative identity for the mobile station, and (2) multiple at least a portion of dynamic radio parameters for the multiple mobile stations including at least a portion of dynamic radio parameters which is to be used by the mobile station when establishing the downlink TBF.

18. The mobile station of claim 17, wherein the processor further executes the processor-executable instructions to receive new system information (SI) from the BSS while in idle mode, wherein the new SI includes static radio parameters which are to be used when establishing the downlink TBF.

19. The mobile station of claim 17, wherein the immediate assignment message further includes static radio parameters which are to be used when establishing the downlink TBF.

20. The mobile station of claim 17, wherein the processor further executes the processor-executable instructions to receive a supplemental message after receiving the immediate assignment message, wherein the supplemental message is received on a Packet Associated Control Channel (PACCH) from the BSS, and wherein the supplemental message comprises multiple remaining portions of the dynamic radio parameters for the multiple mobile stations including a remaining portion of the dynamic radio parameters which is to be used by the mobile station when establishing the downlink TBF.

21. The mobile station of claim 17, wherein the processor further executes the processor-executable instructions to receive a supplemental message after receiving the immediate assignment message, wherein the supplemental message is received on a Packet Associated Control Channel (PACCH) from the BSS, wherein the supplemental message comprises (1) additional static radio parameters to be used by the mobile station when establishing the downlink TBF, and (2) multiple remaining portions of the dynamic radio parameters for the multiple mobile stations including a remaining portion of the dynamic radio parameters which is to be used by the mobile station when establishing the downlink TBF.

22. The mobile station of claim 17, wherein the processor further executes the processor-executable instructions to receive a supplemental message after receiving the immediate assignment message, wherein the supplemental message is received on a Packet Associated Control Channel (PACCH) from the BSS, and wherein the supplemental message comprises additional static radio parameters, and wherein the additional static radio parameters are to be used when establishing the downlink TBF.

23. The mobile station of claim 17, wherein the processor further executes the processor-executable instructions to establish the downlink TBF.

24. The mobile station of claim 23, wherein the processor further executes the processor-executable instructions to receive downlink payload data on the established downlink TBF.

25. A method implemented by a mobile station which interacts with a base station subsystem for improving an Access Grant Channel (AGCH) capacity, the method comprising the steps of:

receiving an alternative identity on Packet Associated Control Channel (PACCH) signaling from the BSS;

while in idle mode, receiving an immediate assignment message on the AGCH sent from the BSS when a downlink Temporary Block Flow (TBF) needs to be established, wherein the immediate assignment message comprises (1) multiple alternative identities for multiple mobile stations including the alternative identity for the mobile station, and (2) multiple at least a portion of dynamic radio parameters for the multiple mobile stations including at least a portion of dynamic radio parameters which is to be used by the mobile station when establishing the downlink TBF.

26. The method of claim 25, further comprising a step of receiving new system information (SI) from the BSS while in idle mode, wherein the new SI includes static radio parameters which are to be used when establishing the downlink TBF.

27. The method of claim 25, wherein the immediate assignment message further includes static radio parameters which are to be used when establishing the downlink TBF.

28. The method of claim 25, after receiving the immediate assignment message further comprising a step of receiving a supplemental message from the BSS, wherein the supplemental message is received on a Packet Associated Control Channel (PACCH), and wherein the supplemental message comprises multiple remaining portions of the dynamic radio parameters for the multiple mobile stations including a remaining portion of the dynamic radio parameters which is to be used by the mobile station when establishing the downlink TBF.

29. The method of claim 25, after receiving the immediate assignment message further comprising a step of receiving a supplemental message from the BSS, wherein the supplemental message is received on a Packet Associated Control Channel (PACCH), wherein the supplemental message comprises (1) additional static radio parameters to be used by the mobile station when establishing the downlink TBF, and (2) multiple remaining portions of the dynamic radio parameters for the multiple mobile stations including a remaining portion of the dynamic radio parameters which is to be used by the mobile station when establishing the downlink TBF.

30. The method of claim 25, after receiving the immediate assignment message further comprising a step of receiving a supplemental message from the BSS, wherein the supplemental message is received on a Packet Associated Control Channel (PACCH), and wherein the supplemental message comprises additional static radio parameters, and wherein the additional static radio parameters are to be used when establishing the downlink TBF.

31. The method of claim 25, further comprising a step of establishing the downlink TBF.

32. The method of claim 31, further comprising a step of receiving downlink payload data on the established downlink TBF.

* * * * *